US010846940B1

(12) United States Patent
McIntyre, Jr. et al.

(10) Patent No.: US 10,846,940 B1
(45) Date of Patent: Nov. 24, 2020

(54) MULTI-MODALITY LOCALIZATION OF USERS

(71) Applicant: SpotMap, Inc., New York, NY (US)

(72) Inventors: Michael Conn McIntyre, Jr., New York, NY (US); Edward Young Zhang, New York, NY (US); Vadim Dagman, Menlo Park, CA (US)

(73) Assignee: SpotMap, Inc., New York, NY (US)

( * ) Notice: Subject to any disclaimer, the term of this patent is extended or adjusted under 35 U.S.C. 154(b) by 0 days.

(21) Appl. No.: 16/799,195

(22) Filed: Feb. 24, 2020

(51) Int. Cl.
*G06T 19/00* (2011.01)
*H04W 4/02* (2018.01)
*G06F 16/29* (2019.01)

(52) U.S. Cl.
CPC ............ *G06T 19/006* (2013.01); *G06F 16/29* (2019.01); *H04W 4/023* (2013.01); *G06T 2219/024* (2013.01)

(58) Field of Classification Search
None
See application file for complete search history.

(56) References Cited

U.S. PATENT DOCUMENTS

| 9,811,734 | B2* | 11/2017 | Williams | G06T 7/74 |
| 10,048,753 | B1* | 8/2018 | Brooks | G06F 3/011 |
| 2013/0196772 | A1* | 8/2013 | Latta | G06Q 10/00 463/42 |
| 2013/0281110 | A1* | 10/2013 | Zelinka | G01S 5/0284 455/456.1 |
| 2014/0267234 | A1* | 9/2014 | Hook | G06T 19/006 345/419 |
| 2014/0354685 | A1* | 12/2014 | Lazarow | G02B 27/0172 345/633 |
| 2017/0123750 | A1* | 5/2017 | Todasco | G06F 21/10 |
| 2019/0362148 | A1* | 11/2019 | Beier | G06T 19/006 |
| 2019/0388781 | A1* | 12/2019 | Taylor | A63F 13/5375 |

* cited by examiner

*Primary Examiner* — Jason A Pringle-Parker

(74) *Attorney, Agent, or Firm* — Cognition IP, P.C.; Edward Steakley

(57) ABSTRACT

Systems and methods providing for determining physical location of a device of a user of an augmented reality environment corresponding to a physical space. The systems and methods involve requesting and receiving a list of participating users having a GPS location within a predetermined radius of a first device; sending advertising and scanning beacons, via a first wireless network, to generate a second list of devices present in the physical space; performing simultaneous localization and mapping (SLAM) using the participating devices of the second list; generating a third list based at least partly on a Bluetooth connection between the one or more participating devices of the second list; and identifying the participating devices of the third list.

18 Claims, 15 Drawing Sheets

MULTI-MODALITY LOCALIZATION OF USERS

FIELD

This invention relates generally to the field of augmented reality (AR), and more particularly to environment mapping during interaction with an AR environment.

BACKGROUND

Augmented reality environments allow for users to interact with virtual and real objects alike. These systems have been used in an informational capacity in places like museums, architectural tours of cities and even in classrooms. Onsite training and guidance are also becoming commonplace. There is a need for real-time mapping of environments, as well as locating other users of the augmented reality environment.

One of the most used applications of augmented reality are Multiplayer Augmented Reality games, where virtual objects are placed in the real world and are interacted with by the players. To overcome the limitations faced regarding mapping and determining location and orientation of players, Augmented Reality games normally take an approach of placing some easily recognizable physical objects into the scene beforehand. These objects are quickly detected by computer vision algorithm as "feature points" that the virtual anchors can be attached to.

Traditionally, construction of the 3D world map with adequate fidelity may take quite a bit of scanning around and might end up being quite time consuming. This may further be exacerbated by the characteristics of the environment, lighting conditions at the current moment and so forth. This presents a challenge in providing compelling user experience for any application that relies on that technology.

SUMMARY

The systems and methods described herein provide for the determination of a physical location of a device of a first user in an augmented reality environment corresponding to a physical space. In one embodiment, the system may send a query to a database requesting a list of participating users having a GPS location within a predetermined radius of the first user. The system may then receive a response from the database comprising, a first list of participating devices within the predetermined radius of the first user. Each participating device may send scanning and advertising beacons via a wireless network. The scanning and advertising beacons may be used to generate a second list of participant devices present in the physical space. The participating devices of the second list may begin performing simultaneous localization and mapping (SLAM) processes to map their respective locations. To further increase the precision, accuracy and speed of the mapping and localization of participant devices, a Bluetooth connection between the participant devices of the second list may be made. A third list may be created, comprising the participant devices connected to via Bluetooth and within a predetermined radius.

Another embodiment relates to receiving three-dimensional maps of the physical space from the participating devices of the second list. The received three-dimensional maps may then be merged into a merged map of the physical space. The three dimensional maps from the participating devices of the second list may be given higher priority than that of the first list in the merged three-dimensional map, as they may have a map of higher accuracy, precision and confidence. As such, participant devices of the third list may have a higher priority than that of the second list, as the Bluetooth connection between participant devices provides for the most accurate localization.

Another embodiment relates to receiving three-dimensional maps of the physical space from the participating devices of the second list. The participating devices may then generate a submap of the physical space, comprising the three-dimensional maps of the physical space received from the participating devices of the second list.

The features and components of these embodiments will be described in further detail in the description which follows. Additional features and advantages will also be set forth in the description which follows, and in part will be implicit from the description, or may be learned by the practice of the embodiments.

BRIEF DESCRIPTION OF THE DRAWINGS

These drawings and the associated description herein are provided to illustrate specific embodiments of the invention and are not intended to be limiting.

DETAILED DESCRIPTION

Figure 1:
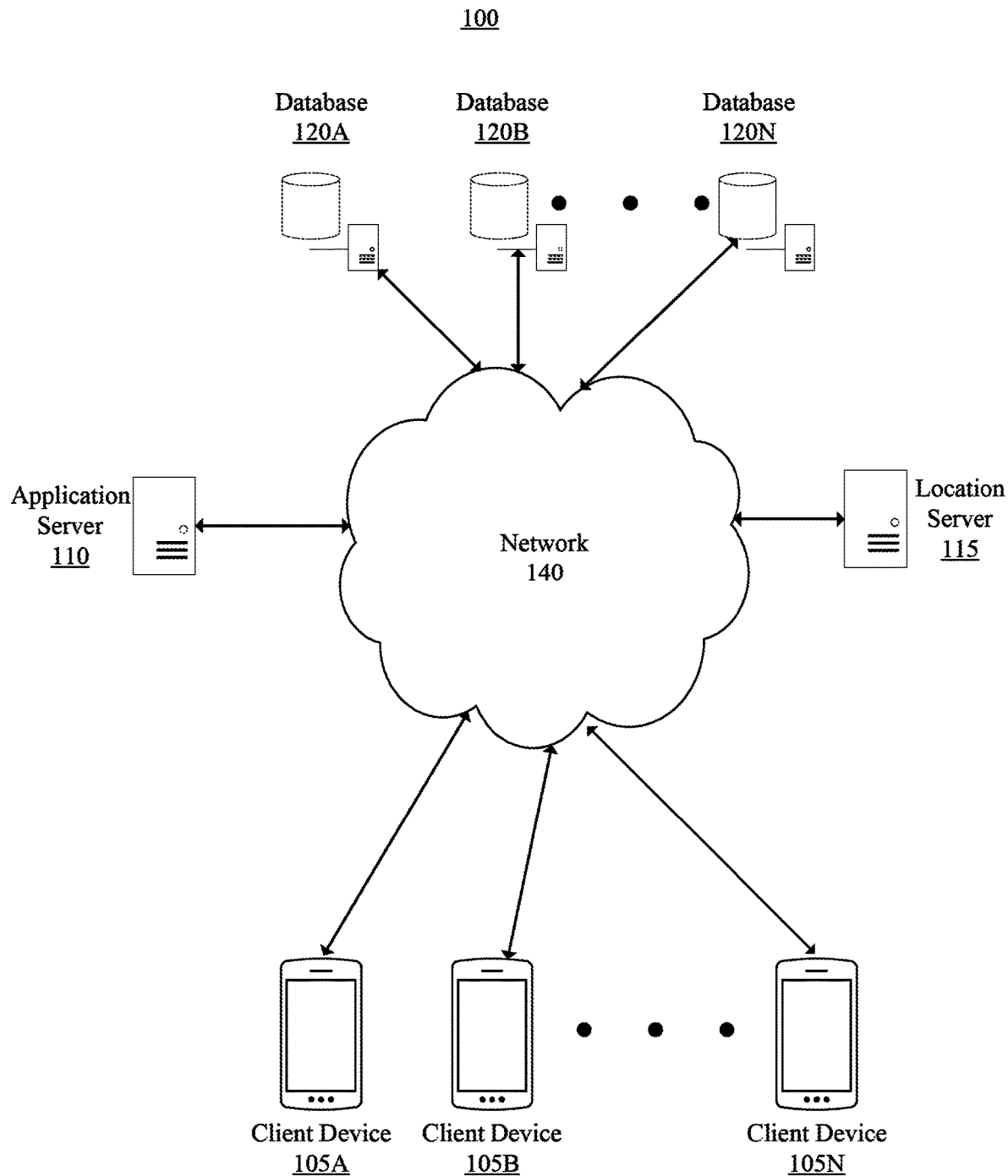
FIG. 1 illustrates an example of a participant device localization and collaborative environment mapping system in accordance with aspects of the present disclosure.

In this specification, reference is made in detail to specific examples of the claimed systems and methods. Some of the examples or their aspects are illustrated in the drawings.

For clarity in explanation, the systems and methods herein have been described with reference to specific examples, however it should be understood that the systems and methods herein are not limited to the described examples. On the contrary, the systems and methods described herein cover alternatives, modifications, and equivalents as may be included within their respective scopes as defined by any patent claims. The following examples of the systems and methods are set forth without any loss of generality to, and without imposing limitations on, the claimed systems and methods. In the following description, specific details are set forth in order to provide a thorough understanding of the systems and methods. The systems and methods may be practiced without some or all of these specific details. In addition, well known features may not have been described in detail to avoid unnecessarily obscuring the systems and methods.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

The following generally relates to the localization of participant devices based on Bluetooth connections and signals broadcast between said participant devices. The highly accurate localization of the participant devices provides for a faster and more precise mapping of the physical location occupied by said participant devices. The mapping of a physical location may be performed in a collaborative and parallel manner. The independent mapped regions may then be merged and shared with the other participant devices and stored for later use.

FIG. 1 illustrates an example network diagram of a participant device localization and collaborative environment mapping system 100 in accordance with aspects of the present disclosure. The localization and mapping processes may be implemented as a mobile application running on a client device 105A-105N, such as a smartphone, tablet computer or head mounted display.

The participant device localization and collaborative environment mapping system 100 may comprise client devices 105A-105N, application server 110, location server 115, databases 120A-120N and network 140. Client devices 105A-105N may be examples of, or include aspects of, the corresponding element or elements described with reference to FIG. 2A. Application server 110 may be an example of, or include aspects of, the corresponding element or elements described with reference to FIG. 2B. Location server 115 may be an example of, or include aspects of, the corresponding element or elements described with reference to FIG. 2C.

In some embodiments, when participant devices use their cameras to scan the environment, the video frames may be processed through object recognition and computer vision algorithm in order to locate some essential fragments of video information (feature points) that can be tracked from one frame to another. The movement information may be analyzed against the changes in camera orientation to construct a three-dimensional map of the environment (world map). The world map may consist of virtual "anchors" attached to the feature points of the real world along with their positions relative to each other and to the participant's point of view.

The world map may be continuously shared between the participant devices over communication protocols such as Bluetooth and WIFI, or other networks and protocols. The sharing of the map serves two purposes:

Three-dimensional maps constructed by each participant may be combined into a single more complete map.

Since every participant device's position is known within each participant's map, the combined map includes the positions of all contributing participants. By having access to the combined map the participants become aware of their positions relative to each other within the combined map.

Constructing the three-dimensional map of the real world through computer vision and collaborative contribution may create new enhanced experience for social interaction and engagement through crowdsourcing and participation. The map may be continuously shared in real time between all currently present participants via communication protocols and may be merged into a more complete map, taking advantage of each participant's contribution. The map is not only shared between participants in real time but is also retained in the cloud and shared with all future participants to allow for continuous improvement by accumulating all participants' contributions over time. Every new participant entering the scene gets access to the most recent version of the map and improves it further by adding more feature points and associated anchors while scanning the surroundings from a different point of view. Over time the scene gets covered from all possible angles, resulting in an accurate 360-degree three-dimensional map of the physical space. As a result, the user experience continuously improves with each usage of the disclosed embodiments. The more participants that use the system at a given location, the quicker and more accurately they are able to locate each other.

For the map to become more accurate with every contribution the participant contributions are collected in the same environment/location, even though from different angles. Some embodiments rely on crowdsourcing from many participants over time across many different locations, the system 100 may keep separate records of the maps collected in different locations and can choose the right map when requested by a participant at a given location.

Maps from adjacent locations may get continuously consolidated into bigger maps, covering regions comprising these locations. This may result in fewer maps covering bigger regions and less room for error.

In some embodiments, the system uses a multi-stage approach for correlating the map to a given location. First, based on the participant's geographical location (longitude/latitude) the system 100 can find maps previously saved in close-enough proximity. "Close-enough" is defined by the accuracy of the location tracking technology. For example, as of today, the accuracy of location tracking technology, such as global satellite positioning (GPS), is typically within 100 meters.

If no maps are found, the participant may start with a clean slate. If one or more maps are found, the maps are sent to the system/application running on the participant's device. Each map may be accompanied by a set of snapshots. These snapshots may be taken by the system 100 automatically in the previous sessions. Since the system involves scanning the environment with the camera it can take snapshots periodically which in turn may be saved along with the map to the cloud (application server 110, location server 115, databased 120A-120N or combination thereof).

The system can match the snapshots against the environment using image recognition. If a good match is found (meaning the recognition engine reported a match with a level of confidence exceeding a certain threshold), the map that these snapshots correspond to is considered to be the right one. However, if no good match is found, the participant can try to visually recognize which of the snapshots (if any) represents the environment and manually select the map that way.

Once every participant has an accurate map of the place correlated to their locations, the system 100 may use Augmented Reality techniques to help them locate each other (e.g., by placing virtual markers over video next to each participants' location).

In some embodiments, a first stage may consist of querying the location server 115 for all participants whose last reported GPS location is within a certain radius of the user's location. The radius is defined by the minimum precision of the GPS tracking technology used on mobile phones, which is roughly within 100-200 m. This gives the initial set of participants (first list).

The second stage may consist of trimming the initial set further using WiFi peer-to-peer networking. Each of the participants' phones may continuously advertise itself and scan the network for other participants. Once connected, the participants may exchange their identifiers with each other. Only those participants whose identifiers were received are considered to be present, the rest may be removed from the original set. Given typical WIFI network range, this may also exclude all participants who are further than ~100 m away. At the same time, all present participants may start participating in SLAM.

The third stage may make use of Bluetooth low energy (BLE) Bluetooth technology to trim the set further to only those participants who are within a smaller radius compared to the second stage participants (e.g., within ~10 m radius). All participants from stage two may still be participating in SLAM, but the third stage participants (third list) are considered for identification. Furthermore, the system may give higher priority to the third stage participants when merging their contributions to the shared world map. In some embodiments, a special, smaller "submap" can be created that only accumulates contributions from the third stage participants, which may significantly increase the efficiency of SLAM for locating participants who are nearby.

The fourth stage involves identifying participants visually using Augmented Reality techniques once their respective locations are determined with adequate precision.

Figure 2A:
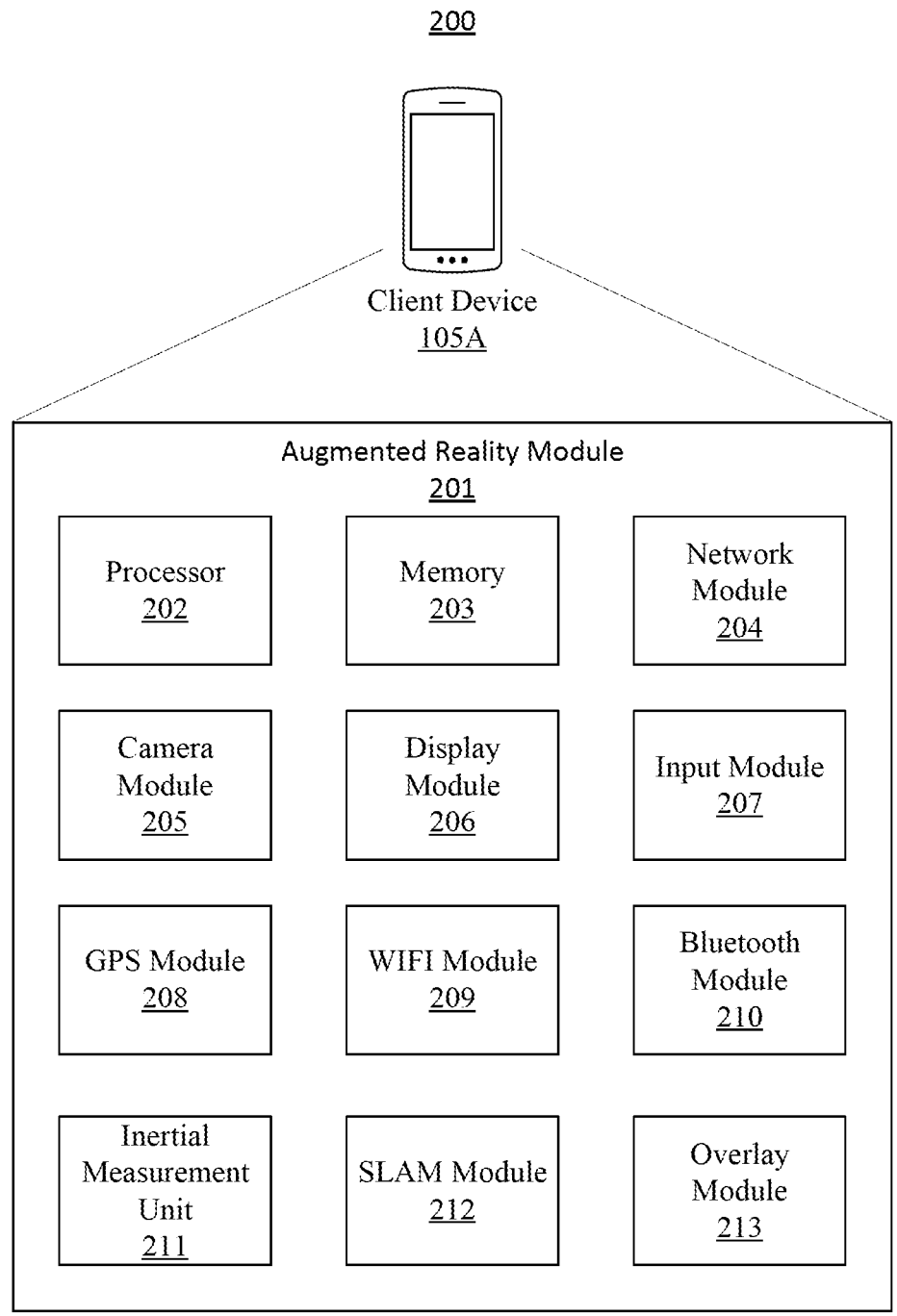
FIG. 2A illustrates an example of an augmented reality module operating on a client device in accordance with aspects of the present disclosure.

FIG. 2A illustrates an example of an augmented reality module 201 on a client device 105A in accordance with aspects of the present disclosure. Augmented reality module 201 may be an example of, or include aspects of, the corresponding element or elements described with reference to FIG. 1. In an example, augmented reality module 201 is a component or system on a client device 105A-105N. In other examples, augmented reality module 201 comprises application server 110, or is a component or system on peripherals or third-party devices. Augmented reality module 200 may comprise hardware or software or both.

Augmented reality module 201 may include processor 202, memory 203, network module 204, camera module 205, display module 206, input module 207, GPS module 208, WIFI module 209, Bluetooth module 210, inertial measurement unit (IMU) 211, SLAM module 212 and overlay module 213.

A processor 202 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 202 may be configured to operate a memory array using a memory controller. In other cases, a memory controller may be integrated into processor 202. The processor 202 may be configured to execute computer-readable instructions stored in a memory to perform various functions related to augmented reality and mapping of environments in the vicinity of the user.

Memory 203 may include random access memory (RAM), read-only memory (ROM), or a hard disk. The memory 203 may be solid state or a hard disk drive, and may store computer-readable, computer-executable software including instructions that, when executed, cause a processor to perform various functions described herein. In some cases, the memory 203 may contain, among other things, a BIOS which may control basic hardware or software operation such as the interaction with peripheral components or devices. In some cases, a memory controller may operate memory cells as described herein.

Network module 204 may transmit and receive network signals and receive signals from other computing systems via a network. In some examples, the network component 204 may enable transmitting and receiving signals from the Internet. signals received by the network component 204 may be used by the other modules. The modules may transmit signals through the network component 204.

Camera module 205 may include one or more cameras or combination of cameras configured to record images. The cameras may be any type of image sensor which provides an image of a scene viewed from the viewpoint of the device, or user, or both. The cameras may be any device configured to detect visible light (e.g., CCD or CMOS based cameras) or light of other spectrums (e.g., multi-spectral or hyper-spectral cameras), such as infrared, ultraviolet, x-rays or any other wavelength the device is capable of detecting. Other types of cameras are possible as well, such as a time-of-flight camera, stereoscopic cameras or other camera combinations capable of determining depth of a captured image/video. The camera module 205 may include hardware, or software, or both, to enable the use of structured light depth determination or time-of-flight depth determination. Camera module 205 may also be other types of range detectors, such as infrared sensors, LIDAR sensors or ultrasonic transceivers. Camera module 205 may also be a combination of two or more of the devices described above.

Display module 206 may be a touch-screen display, a head-up display, a head-mounted display, an optical see-through display, an optical see-around display, a video see-through display, a flat-panel display, a light-emitting diode (LED) display, an electroluminescent display (ELD), an electrophoretic display (EPD or electronic paper), a liquid crystal display (LCD), an organic LED (OLED) display, an active-matrix organic light-emitting diode display or any other type of display on a display device.

Input module 207 may provide the participant with functionality such as selection of location and position of their device. Input module 207 may also perform gesture detection and may receive, as input, data collected by camera module 205, inertial measurement unit 211, or any other sensor provided on the client device 105A-105N, worn on a user, or disposed within the user's environment. The gesture input collected may be related to a user interacting within the AR environment.

Gesture inputs may include, but are not limited to, movement of the client device 105A-105N, such as tilting, rotating, shaking, accelerating, or reorienting of the client device 105A-105N in any way. Client device 105A-105N may be a smartphone, tablet, head mounted display or other handheld computing devices. The gestures may be combinations of movements, repetitions of movements, or durations of movements.

Gesture inputs may further include, but are not limited to, touch and multi-touch operations performed by a user on a touch screen device. Gestures may include swipe or flick, which may cause the display to reorient or dismiss content. A user may perform a pinch gesture with two or more fingers to zoom or select content. Other gestures that include contact and/or movement/number of the contacted points may also be detected.

GPS module 208 may include circuitry configured to receive geolocation and time information from the global navigation satellite system (GNSS). GPS module 208 may accurately estimate the participant device location when there is an unobstructed line of sight between the GPS module 208 and four or more GPS satellites.

WIFI module 209 may include a transceiver and antenna based on IEEE 802.11 standards, including 802.11 a/b/g/n. WIFI module 209 may be used to communicate with access points within an environment, other participating devices, mesh networks, WIFI peer-to-peer networks, WIFI direct, Tunneled Direct Link Setup (TDLS), or combination thereof.

Bluetooth module 210 may include communication circuitry configured to communicate with other devices through Bluetooth (BT) versions 1.0 to 3.0 and/or Bluetooth Low Energy (BLE) versions 4.0 to 5.2. Bluetooth module 210 may be used in the connecting, locating, and identifying of other participant devices within an environment. BT beacons may be used to identify and estimate location of devices belonging to other participants. The signal strength of the BT beacons may be used to estimate distance between one or more devices. A predefined path loss model may be used in the estimation of distance. Alternatively, an adaptive propagation model may be used. Adaptive propagation may model the path loss model with a particle filter. Position can be solved by triangulation of the beacons. Fingerprinting may be used to localize a participant device based on a comparison of signal strength values with data from a fingerprint database. The comparison and estimation of the position may be performed by neural networks, k-nearest neighbor and/or support vector machines. Dead reckoning may also be performed to determine movement and orientation of the participant device. This movement and orientation may be combined with other measurements and estimations. Particle filters may also be used in the gathering of estimations.

Inertial measurement unit 211 may include a gyroscope, an accelerometer and other sensors that may be used for the detection of the movement and orientation of a device. The gyroscope may be any device configured for measuring or maintaining orientation, based on the principles of conservation of angular momentum. Gyroscopes can be mechanical, electronic, or micro-electro-mechanical systems (MEMS), or a combination thereof, gyroscope devices. The gyroscope may be a plurality of the above described device, as well as a combination of the above described devices. The gyroscope may be used in combination with the accelerometer, the camera module 205, and other sensors to determine orientation, location, and pose of the client device 105A-105N, the user, and physical objects captured by the camera module 204. The gyroscope, along with the accelerometer, may be used in the stabilization of images captured by the camera module 205. An accelerometer may be any device capable of measuring the physical acceleration of the client device 105A-105N. The accelerometer may be an electronic device capable of detection acceleration of the device, converting the detected acceleration to an electrical signal, performing conversion from an analog signal to a digital signal, and providing the converted information to a processor, subsystem or module within the client device 105A-105N.

SLAM module 212 may perform mapping operations to construct a map of the environment, while, at the same time, determining the location of the participant and their device based on the map being built. SLAM module 212 may estimate the trajectory of the device as well as the location of landmarks in real-time, without any a priori knowledge of the location. With SLAM the camera pose and map structure may both be recovered while initially knowing neither. The SLAM module 212 may use one or more camera modules 205 to track a set of points through successive camera frames. The tracked set of points may be used to triangulate their 3D position as well as simultaneously calculate the camera pose as it observes those points at their estimated position. Upon observation of sufficient points, SLAM module may solve for both structure and motion.

SLAM module 212 may use particle filters, extended Kalman filters, and other techniques to estimate the posterior probability function for the pose of the device and for the parameters of the map. Collaborative SLAM methods may be used with multiple freely moving cameras to simultaneously compute their egomotion and the 3D map of the surrounding scenes in a highly dynamic environment. Other SLAM methods such as GraphSLAM, EKF SLAM, Fast-SLAM and Parallel Tracking and Mapping (PTAM) may be used.

Overlay module 213 may determine how 3D virtual objects are to be placed and rendered at the positioning, scale/size and orientation specified with relation to the 3D model of the environment. Overlay module 213 may determine the shape or appearance, including texture and color, of the virtual 3D object that is to be placed at the specified location. For example, in the case of crowd sourcing the mapping of an environment, the overlay module 213 may superimpose indicators of the location and position of other participants within the environment. The overlay module 213 may highlight or otherwise visually differentiate additional devices and/or participants actively or passively participating in the augmented reality experience.

Overlay module 213 may alternatively be used to place virtual objects on a virtual reality representation of a person's head, face, hands, or device. Virtual 3D objects, such as hats, jewelry, glasses, clothing, or decorations may be oriented and applied to an image of the user. Annotations and identifying information of the other participants and their devices may also be displayed in a superimposed fashion.

Figure 2B:
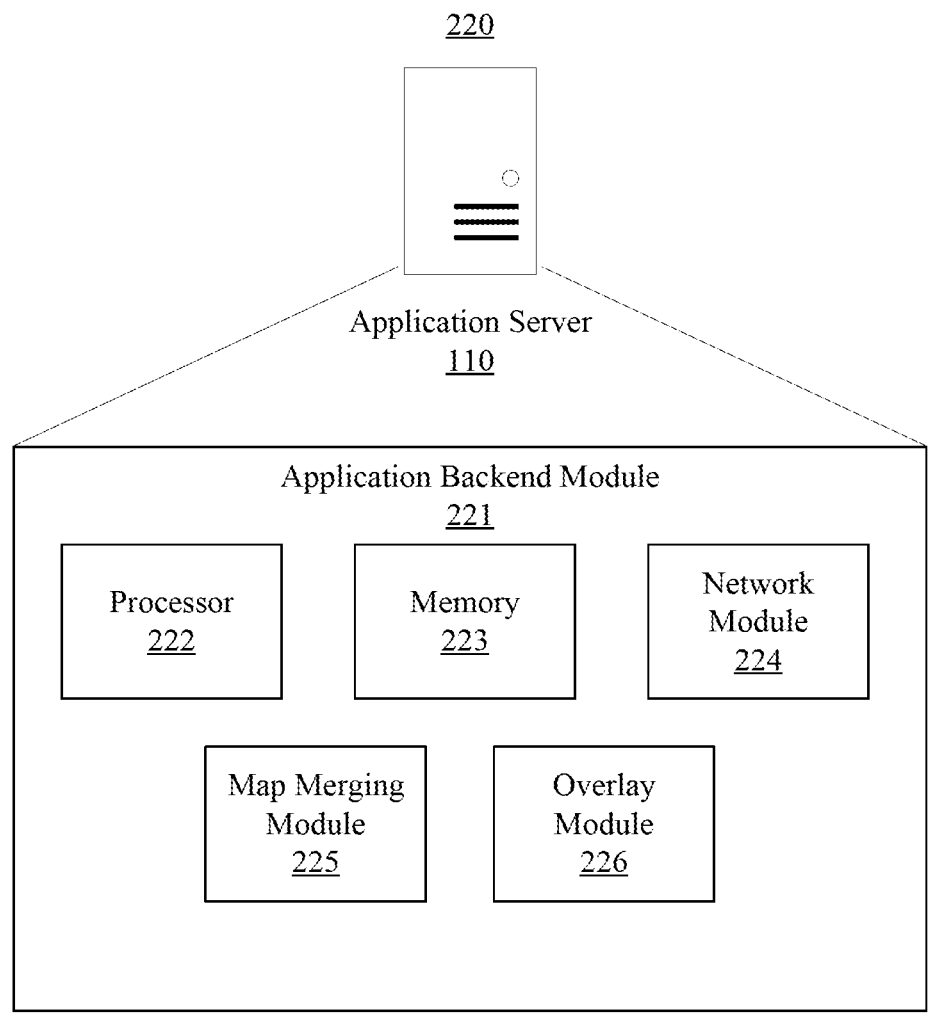
FIG. 2B illustrates an example of an application backend module operating on an application server in accordance with aspects of the present disclosure.

FIG. 2B illustrates an example of an application backend module 221 on an application server 110 in accordance with aspects of the present disclosure. Application backend module 221 may be an example of, or include aspects of, the corresponding element or elements described with reference to FIG. 1. In an example, application backend module 221 is a component or system on an application server 110. In other examples, application backend module 221 comprises client device 105A-105N, location server 115, or is a component or system on peripherals or third-party devices. Application backend module 221 may comprise hardware or software or both.

Application backend module 221 may include processor 222, memory 223, network module 224, map merging module 225, and overlay module 226.

A processor 222 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 222 may be configured to operate a memory array using a memory controller. In other cases, a memory controller may be integrated into processor 222. The processor 222 may be configured to execute computer-readable instructions stored in a memory to perform various functions related to augmented reality and mapping of environments in the vicinity of the user.

Memory 223 may include random access memory (RAM), read-only memory (ROM), or a hard disk. The memory 233 may be solid state or a hard disk drive, and may store computer-readable, computer-executable software including instructions that, when executed, cause a processor to perform various functions described herein. In some cases, the memory 233 may contain, among other things, a BIOS which may control basic hardware or software operation such as the interaction with peripheral components or devices. In some cases, a memory controller may operate memory cells as described herein.

Network module 224 may transmit and receive network signals and receive signals from other computing systems via a network. In some examples, the network component 224 may enable transmitting and receiving signals from the Internet. signals received by the network component 224 may be used by the other modules. The modules may transmit signals through the network component 224.

Map merging module 225 may combine maps generated or updated from one or more participant devices, to refine and update/improve a global map stored either within the application server 221 or in database 120A-120N. Map merging module 225 may be implemented as a client-server architecture, where map data is updated by each of the participating devices and committed back to the application server to for further processing and merging.

Map merging module 225 may additionally or alternatively be implemented as a peer-to-peer architecture on the client device 105A-105N. The participating devices may serve as both clients and servers. Responsibilities for merging of participant maps with the world map may be performed jointly by both participant devices and the application server 120.

Map merging module 225 may also coordinate which portions of the location is to be mapped by each device. After identifying each other, participant devices may be assigned responsibilities by the map merging module 225. The participant devices may identify each other before, during or after mapping.

When participant devices are identified before mapping, the responsibilities can efficiently be divided between the participant devices.

When participant devices are identified during mapping, the current results may be merged, and addition responsibilities for each of the participant devices may be determined and performed in parallel.

When participant devices are identified after mapping is completed, the participant maps are shared and merged.

Merging of the participant maps may be performed at each participant device, at a single participant device and then shared (when one participant device is better suited for the processing based on processor type, processor speed, system power consumption, remaining battery power, graphics processor, network connection speed, amount of memory, memory refresh rate, storage space, storage latency, bus frequency), at some but not all participant devices (prioritize devices with higher level of compatibility, only ones with similar architecture, same operating system or combination thereof), or through distributed computing on the cloud.

Overlay module 226 may determine how 3D virtual objects are to be placed and rendered at the positioning, scale/size and orientation specified in relation to the 3D model of the environment. Overlay module 226 may determine the shape or appearance, including texture and color, of the virtual 3D object that is to be placed at the specified location. For example, in the case of crowd sourcing the mapping of an environment, the overlay module 226 provide the indicators and information to be superimposed as well as the location and position of the other participants within the environment. The participant may use this information in the compositing of the indicators and information with the video captured by the participant device. The overlay module 226 may highlight or otherwise visually differentiate additional devices and/or participants actively or passively participating in the augmented reality experience. Annotations and identifying information of the other participants and their devices may also be displayed in a superimposed fashion.

Figure 2C:
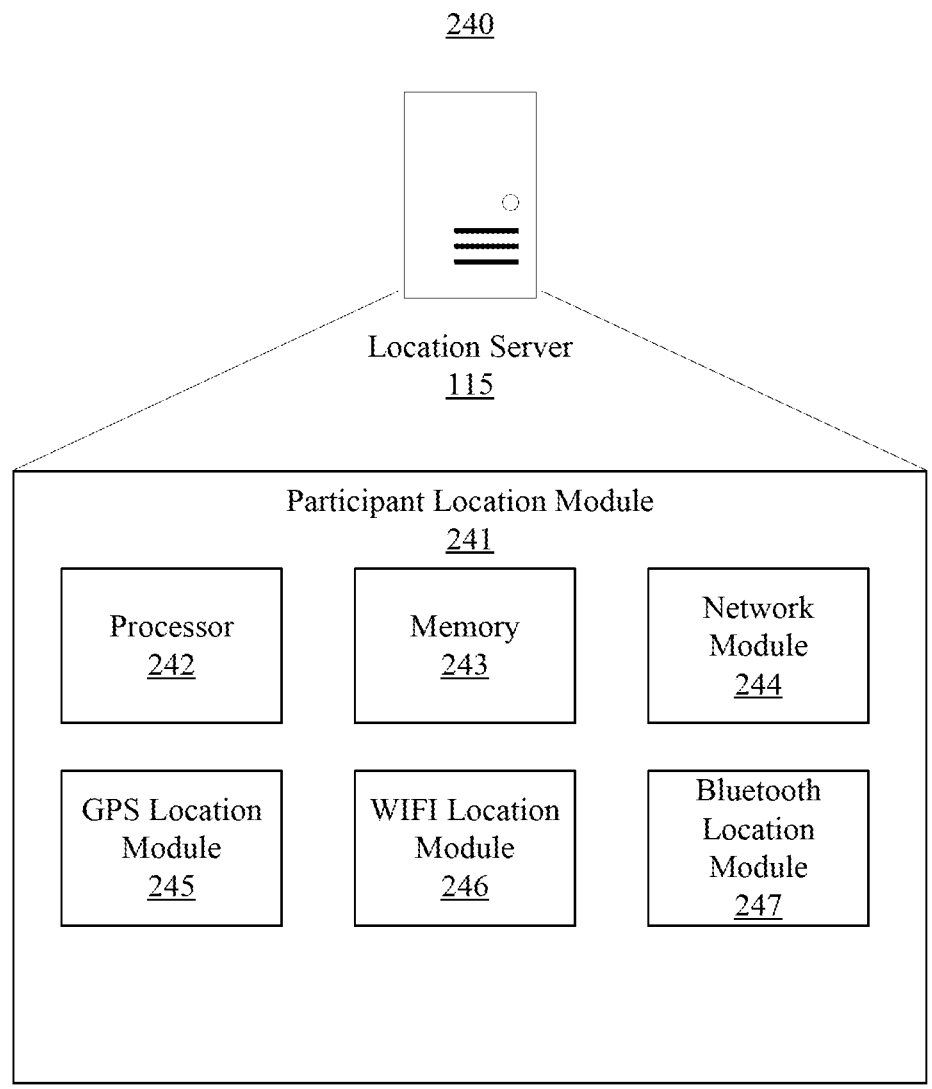
FIG. 2C illustrates an example of a participant location module operating on a location server in accordance with aspects of the present disclosure.

FIG. 2C illustrates an example of a participant location module 241 on a location server 115 in accordance with aspects of the present disclosure. Participant location module 241 may be an example of, or include aspects of, the corresponding element or elements described with reference to FIG. 1. In an example, participant location module 241 is a component or system on a location server 115. In other examples, participant location module 241 comprises client device 105A-105N, application server 115, or is a component or system on peripherals or third-party devices. Participant location module 241 may comprise hardware or software or both.

Participant location module 241 may include processor 242, memory 243, network module 244, GPS location module 245, WIFI location module 246 and Bluetooth location module 247.

A processor 242 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 242 may be configured to operate a memory array using a memory controller. In other cases, a memory controller may be integrated into processor 242. The processor 242 may be configured to execute computer-readable instructions stored in a memory to perform various functions related to augmented reality and mapping of environments in the vicinity of the user.

Memory 243 may include random access memory (RAM), read-only memory (ROM), or a hard disk. The memory 243 may be solid state or a hard disk drive, and may store computer-readable, computer-executable software including instructions that, when executed, cause a processor to perform various functions described herein. In some cases, the memory 243 may contain, among other things, a BIOS which may control basic hardware or software operation such as the interaction with peripheral components or devices. In some cases, a memory controller may operate memory cells as described herein.

Network module 244 may transmit and receive network signals and receive signals from other computing systems via a network. In some examples, the network component 244 may enable transmitting and receiving signals from the Internet. signals received by the network component 244 may be used by the other modules. The modules may transmit signals through the network component 244.

GPS location module 245 may store a list of participant devices and their current and past locations. This list may also be stored in databases 120A-120N. GPS location module 245 may provide participant devices with a list of other participant devices within a predetermined radius of the requesting device.

WIFI location module 246 may store a list of participant devices and their current and past locations. WIFI location module may also store and update a list of access points within range of each participant device as well as each participant device within range of each access point. This information may be used to further refine position estimates by providing more known landmarks/beacons within an environment. These lists may also be stored in databases 120A-120N.

Bluetooth location module 247 may store a list of participant devices within range of each participant device within an environment. This list may be updated by the participant devices themselves.

Figure 3:
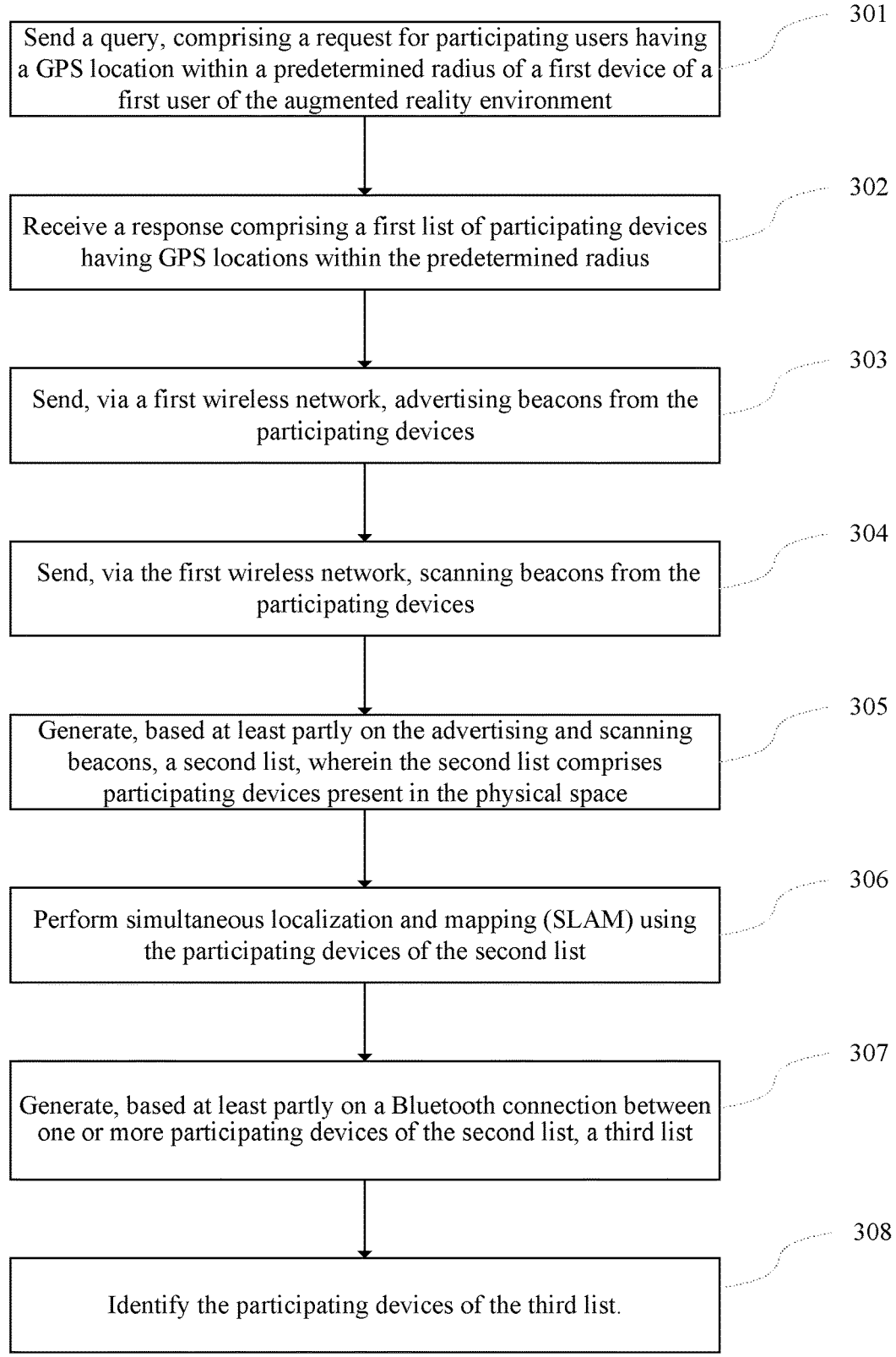
FIG. 3 illustrates an example of a process for locating participants, mapping an environment and determining the identity of participants within the environment in accordance with aspects of the present disclosure.

FIG. 3 illustrates an example of the process 300 of locating participants, mapping an environment and determining the identity of participants within the environment in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 301, the system sends a query, comprising a request for participating users having a GPS location within a predetermined radius of a first device of a first user of the augmented reality environment. The query may be sent directly to database 120A-120N. The request may also be sent to location server 120, where a list of participants may be stored and updated while participants are currently in a location. The GPS location module 245 of location server 120 may periodically update the database 120A-120N while processing requests for the participant list or while updating the list with data received from participants currently at the location. GPS location module 245 may also be configured to update the database 120A-120N only after the location no longer has any participants, the number of participants drops below a threshold, or the number of participants exceeds a threshold.

At step 302, the system receives a response comprising a first list of participating devices having GPS locations within the predetermined radius. Each participating device will become vaguely aware of all other devices within the predetermined radius. In other words, at this step, each device may receive an indication of the presence of another participating device.

At step 303, the system sends, via a first wireless network, advertising beacons from the participating devices.

At step 304, the system sends, via the first wireless network, scanning beacons from the participating devices.

At step 305, the system generates, based at least partly on the advertising and scanning beacons, a second list, wherein the second list comprises participating devices present in the physical space. The second list may be transmitted to the WIFI location module 246 of the location server 120.

At step 306, the system performs simultaneous localization and mapping (SLAM) using the participating devices of the second list. The mapping tasks may be divided between one or more participating devices. The division of processing between participating devices may be implemented as single instruction stream, multiple data streams (SIMD), multiple instruction streams, single data stream (MISD) or multiple instruction streams, multiple data streams (MIMD).

At step 307, the system generates, based at least partly on a Bluetooth connection between one or more participating devices of the second list, a third list. The third list comprises participating devices of the second list determined to be within a predetermined distance of one another.

At step 308, the system identifies the participating devices of the third list.

Figure 4:
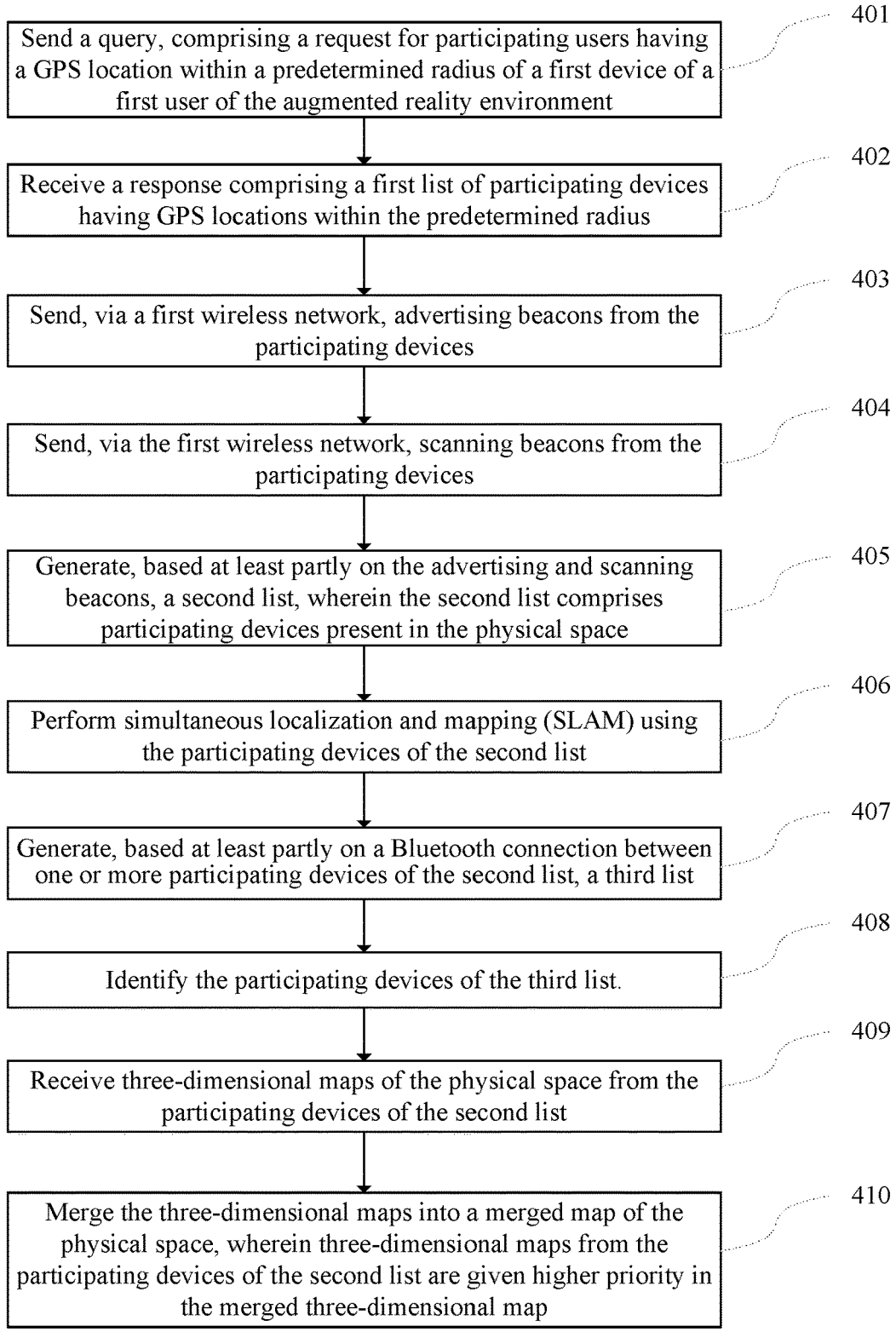
FIG. 4 illustrates another example of a process for locating participants and collaboratively mapping an environment in accordance with aspects of the present disclosure.

FIG. 4 illustrates an example of the process 400 of locating participants and collaboratively mapping an environment in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 401, the system sends a query, comprising a request for participating users having a GPS location within a predetermined radius of a first device of a first user of the augmented reality environment. The query may be sent directly to database 120A-120N. The request may also be sent to location server 120, where a list of participants may be stored and updated while participants are currently in a location. The GPS location module 245 of location server 120 may periodically update the database 120A-120N while processing requests for the participant list or while updating the list with data received from participants currently at the location. GPS location module 245 may also be configured to update the database 120A-120N only after the location no longer has any participants, the number of participants drops below a threshold, or the number of participants exceeds a threshold.

At step 402, the system receives a response comprising a first list of participating devices having GPS locations within the predetermined radius. Each participating device will become vaguely aware of all other devices within the predetermined radius.

At step 403, the system sends, via a first wireless network, advertising beacons from the participating devices.

At step 404, the system sends, via the first wireless network, scanning beacons from the participating devices.

At step 405, the system generates, based at least partly on the advertising and scanning beacons, a second list, wherein the second list comprises participating devices present in the physical space. The second list may be transmitted to the WIFI location module 246 of the location server 120.

At step 406, the system performs simultaneous localization and mapping (SLAM) using the participating devices of the second list. The mapping tasks may be divided between one or more participating devices. The division of processing between participating devices may be implemented as Single instruction stream, multiple data streams (SIMD), Multiple instruction streams, single data stream (MISD) or Multiple instruction streams, multiple data streams (MIMD).

At step 407, the system generates, based at least partly on a Bluetooth connection between one or more participating devices of the second list, a third list. The third list comprises participating devices of the second list determined to be within a predetermined distance of one another.

At step 408, the system identifies the participating devices of the third list.

At step 409, the system receives three-dimensional maps of the physical space from the participating devices.

At step 410, the system merges the three-dimensional maps into a merged map of the physical space, wherein three-dimensional maps from the participating devices of the second list are given higher priority in the merged three-dimensional map. Participant devices of the second list may generate maps that are more accurate and more precise than those not in the second list. The localization precision is increased between the participant devices of the second list due to their proximity to one another and the use of direct connections between the participant devices.

Figure 5:
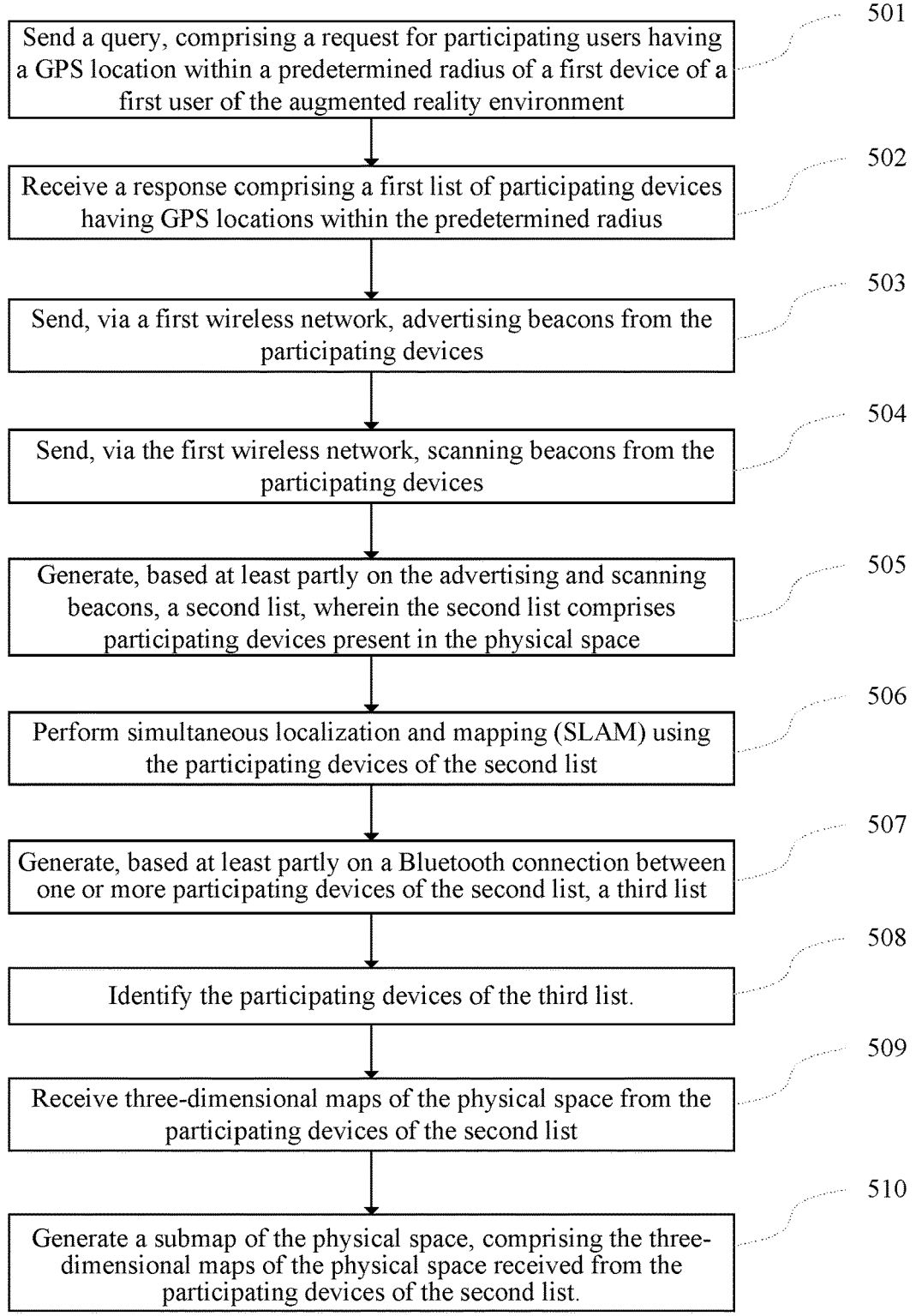
FIG. 5 illustrates another example of a process for locating participants and collaboratively mapping, including generation of submaps, an environment in accordance with aspects of the present disclosure.

FIG. 5 illustrates an example of the process 500 of locating participants and collaboratively mapping, including generation of submaps, an environment in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 501, the system sends a query, comprising a request for participating users having a GPS location within a predetermined radius of a first device of a first user of the augmented reality environment. The query may be sent directly to database 120A-120N. The request may also be sent to location server 120, where a list of participants may be stored and updated while participants are currently in a location. The GPS location module 245 of location server 120 may periodically update the database 120A-120N while processing requests for the participant list or while updating the list with data received from participants currently at the location. GPS location module 245 may also be configured to update the database 120A-120N only after the location no longer has any participants, the number of participants drops below a threshold, or the number of participants exceeds a threshold.

At step 502, the system receives a response comprising a first list of participating devices having GPS locations within the predetermined radius. Each participating device will become vaguely aware of all other devices within the predetermined radius.

At step 503, the system sends, via a first wireless network, advertising beacons from the participating devices.

At step 504, the system sends, via the first wireless network, scanning beacons from the participating devices.

At step 505, the system generates, based at least partly on the advertising and scanning beacons, a second list, wherein the second list comprises participating devices present in the physical space. The second list may be transmitted to the WIFI location module 246 of the location server 120.

At step 506, the system performs simultaneous localization and mapping (SLAM) using the participating devices of the second list. The mapping tasks may be divided between one or more participating devices. The division of processing between participating devices may be implemented as Single instruction stream, multiple data streams (SIMD), Multiple instruction streams, single data stream (MISD) or Multiple instruction streams, multiple data streams (MIMD).

At step 507, the system generates, based at least partly on a Bluetooth connection between one or more participating devices of the second list, a third list. The third list comprises participating devices of the second list determined to be within a predetermined distance of one another.

At step 508, the system identifies the participating devices of the third list.

At step 509, the system receives three-dimensional maps of the physical space from the participating devices of the second list.

At step 510, the system generates a submap of the physical space, comprising the three-dimensional maps of the physical space received from the participating devices of the second list. These submaps may be given higher priority as they are of higher resolution, accuracy and precision.

Figure 6:
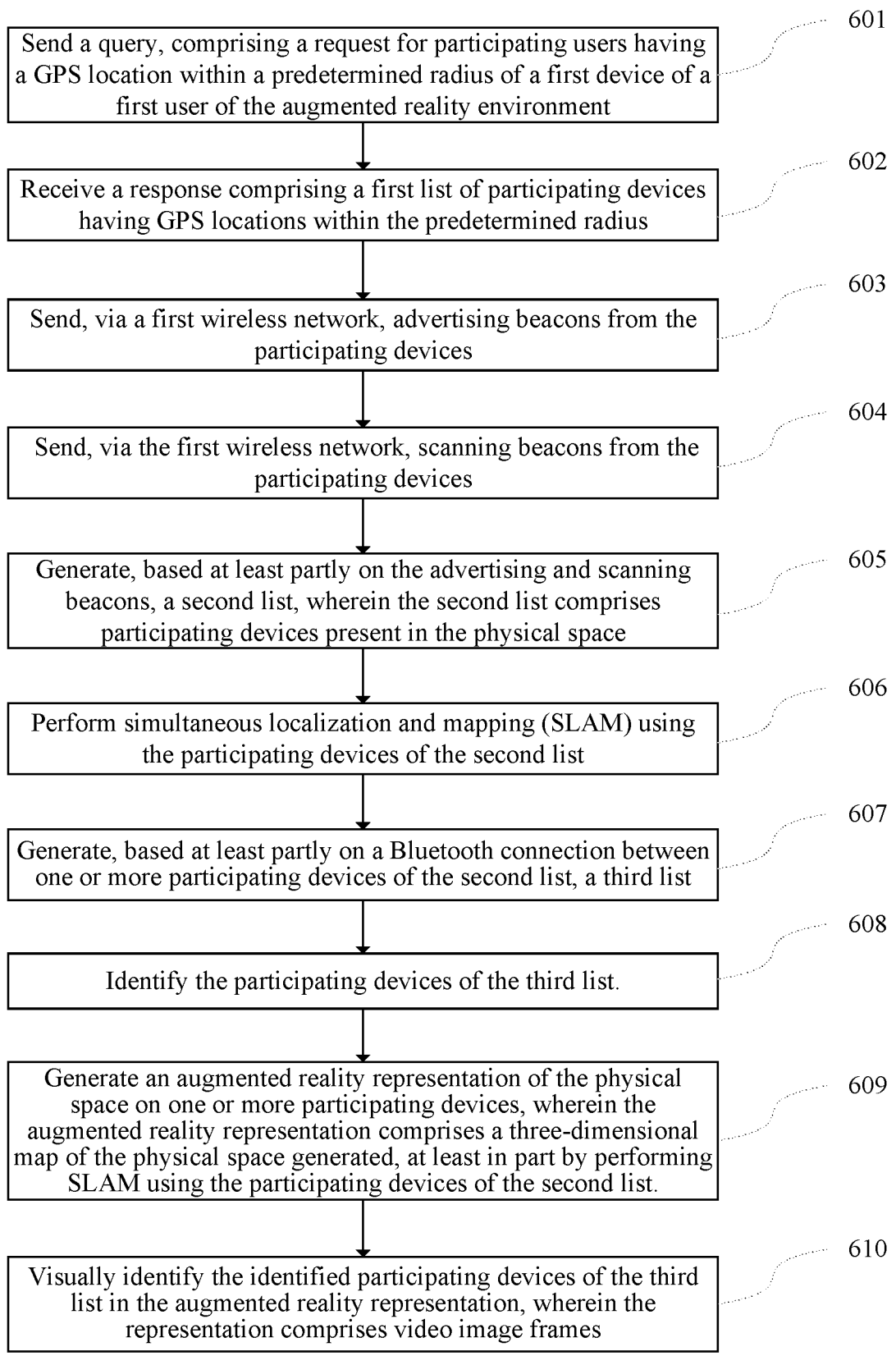
FIG. 6 illustrates another example of a process for locating participants and generating augmented reality representations of a physical space by collaboratively mapping an environment in accordance with aspects of the present disclosure.

FIG. 6 illustrates an example of the process 600 of locating participants and generating augmented reality representation of a physical space by collaboratively mapping an environment in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 601, the system sends a query, comprising a request for participating users having a GPS location within a predetermined radius of a first device of a first user of the augmented reality environment. The query may be sent directly to database 120A-120N. The request may also be sent to location server 120, where a list of participants may be stored and updated while participants are currently in a location. The GPS location module 245 of location server 120 may periodically update the database 120A-120N while processing requests for the participant list or while updating the list with data received from participants currently at the location. GPS location module 245 may also be configured to update the database 120A-120N only after the location no longer has any participants, the number of participants drops below a threshold, or the number of participants exceeds a threshold.

At step 602, the system receives a response comprising a first list of participating devices having GPS locations within the predetermined radius. Each participating device will become vaguely aware of all other devices within the predetermined radius.

At step 603, the system sends, via a first wireless network, advertising beacons from the participating devices.

At step 604, the system sends, via the first wireless network, scanning beacons from the participating devices.

At step 605, the system generates, based at least partly on the advertising and scanning beacons, a second list, wherein the second list comprises participating devices present in the physical space. The second list may be transmitted to the WIFI location module 246 of the location server 120.

At step 606, the system performs simultaneous localization and mapping (SLAM) using the participating devices of the second list. The mapping tasks may be divided between one or more participating devices. The division of processing between participating devices may be implemented as Single instruction stream, multiple data streams (SIMD), Multiple instruction streams, single data stream (MISD) or Multiple instruction streams, multiple data streams (MIMD).

At step 607, the system generates, based at least partly on a Bluetooth connection between one or more participating devices of the second list, a third list. The third list comprises participating devices of the second list determined to be within a predetermined distance of one another.

At step 608, the system identifies the participating devices of the third list.

At step 609, the system generates an augmented reality representation of the physical space on one or more participating devices, wherein the augmented reality representation comprises a three-dimensional map of the physical space generated, at least in part by performing SLAM using the participating devices of the second list.

At step 610, the system visually identifies the identified participating devices of the third list in the augmented reality representation, wherein the representation comprises video image frames. The visually identifying of participant devices may take the form of highlighting of the area around the participant, overlaying of graphics proximate to the participant device, labelling of the participant device with information related to the participant or the participant device or combination thereof.

Figure 7:
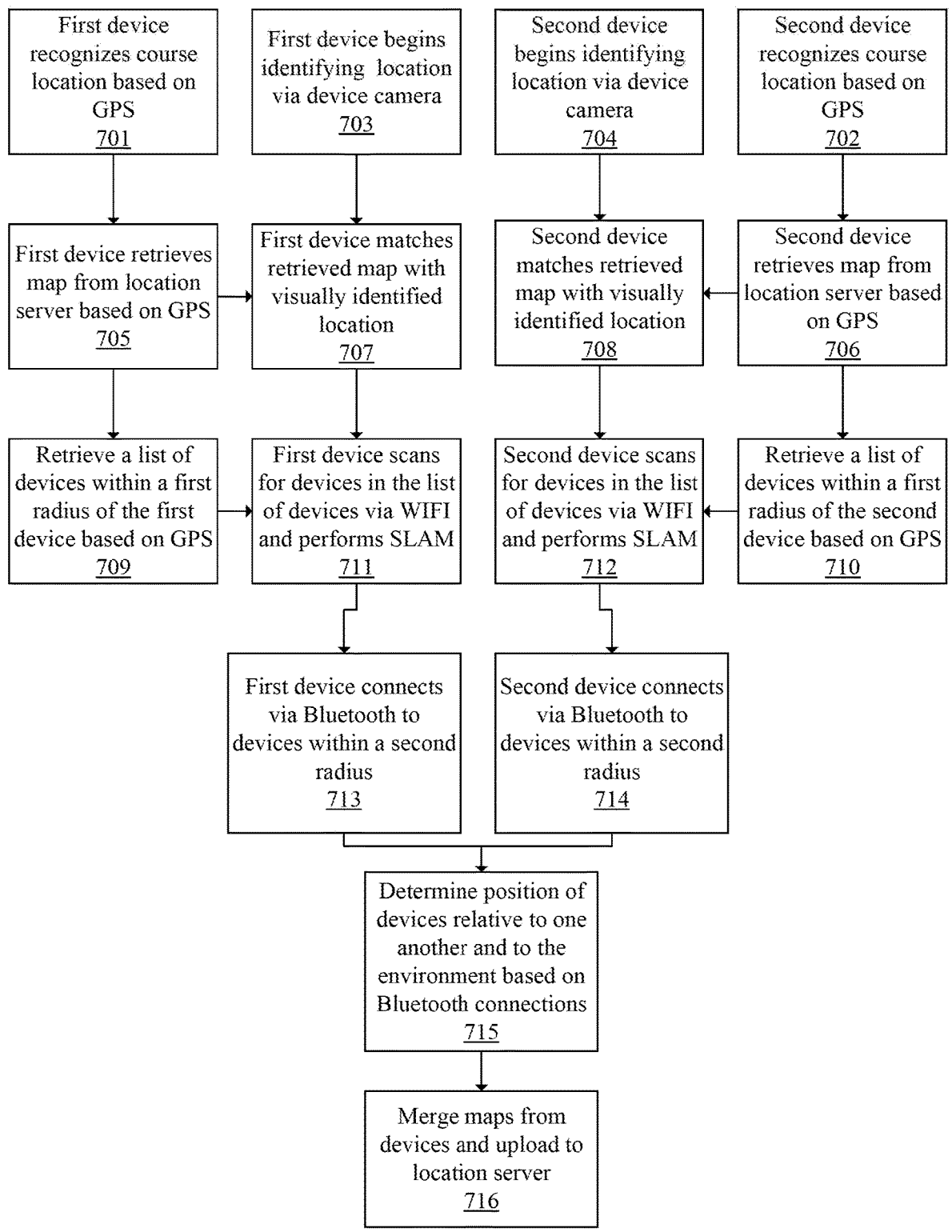
FIG. 7 illustrates an example of a process for collaborative and parallel mapping of an environment by participant devices in accordance with aspects of the present disclosure.

FIG. 7 illustrates an example of a process 700 of a collaborative and parallel mapping of an environment by participant devices in accordance with aspects of the present disclosure. In this example, a first device and second device are both operating within an environment. One or more additional participant devices may be present and may also collaborate in the same manner as the first device and second device. Steps 701-704 may be performed in parallel. Steps 705 and 707 may be performed in parallel with step 709, and steps 706 and 708 may be performed in parallel with step 710. Additionally, steps 711 and 712, as well as 713 and 714 may be performed in parallel on each of the participating devices. Step 715 and 716 may be performed by one or all of the participating devices.

At step 701 and 702, the client devices recognize the course location of each device based on GPS module 208 coordinates.

At step 703 and 704, client devices begin identifying the location of the environment of each device via the camera module 205.

At step 705 and 706, the client devices retrieve maps of the course location from the application server 110 and/or the location server 115. The maps retrieved are based on GPS module 208 coordinates and may include a course representation of the coordinates at which the client devices are located. Additionally or alternatively, a larger area of maps may be retrieved from the location server 110. The retrieved map representation resolution and area may be dependent upon the precision and accuracy of the location method. GPS module 208 may provide a precision of between 100 and 200 meters. Precision of the location determination may be dependent upon environmental obstructions, signal interference, or hardware/electrical circuitry, or combination thereof.

At step 707 and 708, the client devices match the retrieved maps with the visually identified location of each device.

At step 709 and 710, the client devices retrieve a list of participant devices within a first radius of each device from the location server 115, based on GPS module 208 coordinates.

At step 711 and 712, the client devices scan for participant devices in the list of devices via WIFI module 209. The devices may connect to one or more participant devices within the WIFI module 209 range via WIFI peer-to-peer network, WIFI direct, Tunneled Direct Link Setup (TDLS), or combination thereof. The SLAM module of each client device may also begin estimating location and building maps of the environment in collaboration with participant devices that have been detected and connected to. The client devices may each generate a second list of participant devices within a second radius, corresponding to the signal range of the WIFI module 209. The second list may be a subset of the previously retrieved list. WIFI localization may be performed by triangulation. WIFI location estimation may be more precise than that of GPS module 208. One or more WIFI access points may be present within an environment. Access points may be used as stationary beacons to improve the accuracy of client device location estimates.

At step 713 and 714, the client devices connect via Bluetooth to participant devices within a second radius of the participating devices. A set of devices may be determined that are capable of being connected to one another.

At step 715 the set of client devices from steps 713 and 714 may be used in the determination of positions of said devices. The Bluetooth signal may be used to transmit and receive beacons, as well as packet data from other devices that may be used in determining locations of said devices relative to the mapped environment. Signal strength and fingerprint of the Bluetooth signals may be used to determine a precise location of other devices. Dead reckoning may also be used to determine movement and orientation/pose of the device, which may increase the accuracy and precision of the device localization.

At step 716 the client devices may merge the maps generated independently from one another into a complete map of the location. This map may then be uploaded to the application server 110, location server 115, databases 120A-120N or combination thereof.

Figure 8:
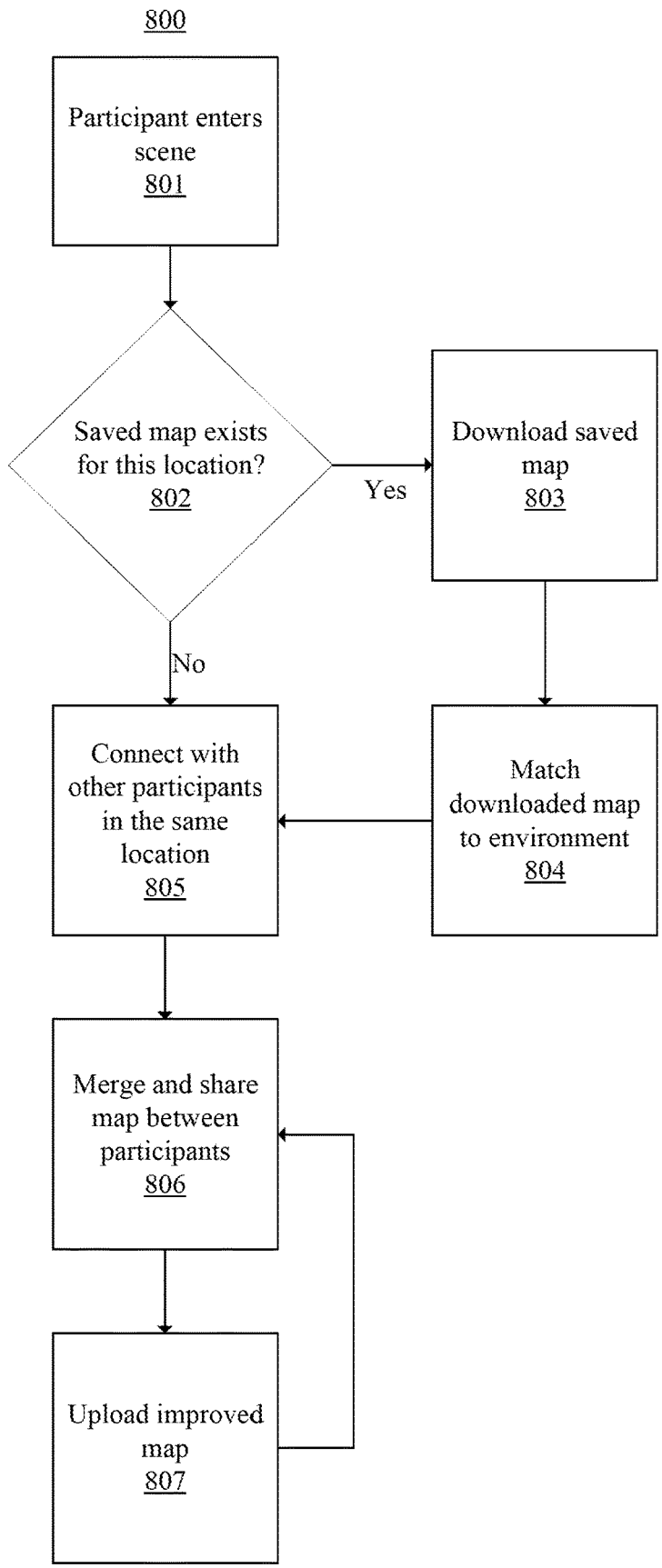
FIG. 8 illustrates an example of a process for sharing, merging and improving maps of an environment in accordance with aspects of the present disclosure.

FIG. 8 illustrates an example of a process 800 for sharing, merging and improving maps of an environment in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein. The process 800 may be performed on client devices 105A-105N, application server 110, location server 115 or a combination thereof.

At step 801, a participant enters the scene or environment in which augmented images are to be superimposed. There may be one or more other participants already in proximity to the participant. Additional participants may also enter the scene or environment after the participant. Current participants may also leave the scene or environment, or cease participating in the scene or environment.

At step 802, a determination is made, as to whether or not, a previously saved map exists for the current location. The previously saved map may be a locally saved map on the participant device, application server 110, location server 115, databases 120A-120N or combination thereof. The saved map may be a map generated entirely by the participant, entirely by other participants currently and/or previously at the location, by merging of multiple participant maps currently and/or previously at the location, or combination thereof.

At step 803, the participant device may download a saved map from storage residing on the participant device, other participant devices such as client device 105A-105N, application server 110, location server 115, databases 120A-120N or combination thereof. The saved map may be a course low resolution map, a partial map or a high resolution map. When retrieving a map from the other participant devices, the application server 110, the location server 115 or databases 120A-120N, a decision may be made as to the area that the requested map covers, the resolution of the map, and which data to include in or along with the map. When a connection speed between the participant device and other participant devices, servers and databases is slow, a lower resolution map may be transferred. If the time required for the participant device to generate a comparable map to that of the previously saved map is less than the time required to retrieve the saved map of equal accuracy and precision, a decision is made as to what data may be requested, transmitted and/or received by the participant device. The participant device may then choose to receive a portion of the map, a lower resolution map, sets of points such as landmarks and fiducials that can be used as reference points by the participant device in generating a map or combination thereof. The decision may also be made by application server 110 or location server 115.

At step 804, the participant device matches the downloaded map to environment. The matching may be used in the estimation of the orientation and location of the participant device.

At step 805, the participant device connects with other participants in the same location. This may be performed by the participant device performing a scan for other participant devices via WIFI module 209. The participant device may connect to one or more other participant devices within the WIFI module 209 range via WIFI peer-to-peer network, WIFI direct, Tunneled Direct Link Setup (TDLS), or combination thereof. The participant may additionally or alternatively connect to other participant devices within a range of the Bluetooth module 210.

At step 806, the participant device may merge and share maps with other participant devices and/or servers. The merging of maps may be implemented as a peer-to-peer, client/server or distributed computing architecture.

At step 807, the improved map generated by the merge at step 806, may then be uploaded to the application server 110, the location server 115 or databases 120A-120N. Alternatively or additionally, the merging of maps may be performed on the application server 110 or the location server 115, uploaded to the database, and then redistributed back to the participant devices for further collaborative refinement. The steps 806 and 807 may be repeated for a predetermined number of times or until one or more parameters (e.g., covered map area, resolution, fidelity, etc.) of the improved map are reached. The process 800 then ends.

Figure 9:
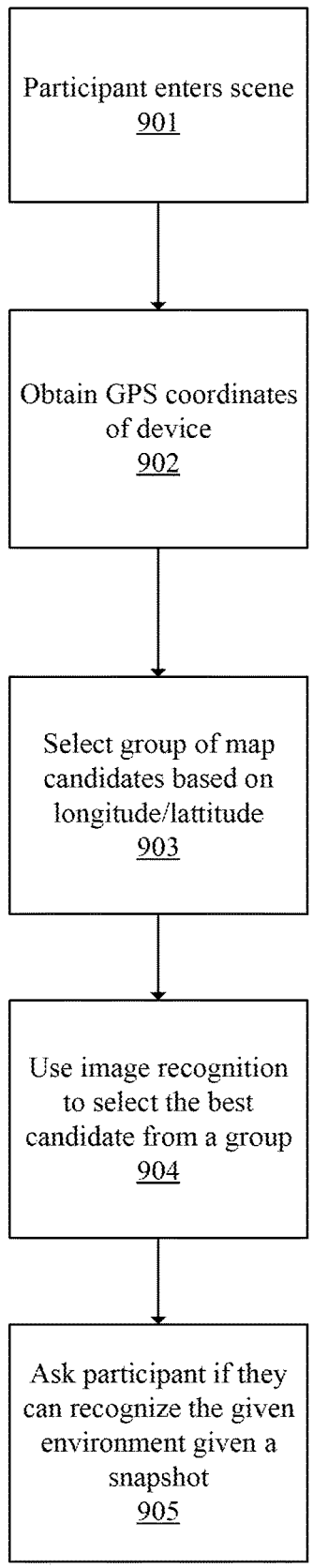
FIG. 9 illustrates an example of a process for matching a retrieved map from a location server with an environment recognized through the camera module of the participant device in accordance with aspects of the present disclosure.

FIG. 9 illustrates an example of a process 900 for matching a retrieved map from a location server with an environment recognized through the camera module of the participant device in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 901, a participant enters the scene. There may be one or more other participants currently at the location and participating in the mapping and localization of other participants.

At step 902, the participant device obtains GPS coordinates of device from the GPS module 208.

At step 903, the system may select a group of map candidates based on longitude/latitude of the participant device.

At step 904, the system may use image recognition to select the best, near best or an optimum candidate map from the group of maps.

At step 905, the system may ask the participant if they can recognize the given environment based on a given a snapshot. The snapshot may be an image captured at the time of map creation. The selection of the correct map for a given location may reduce the amount of time required to further map and refine the map area.

Figure 10A:
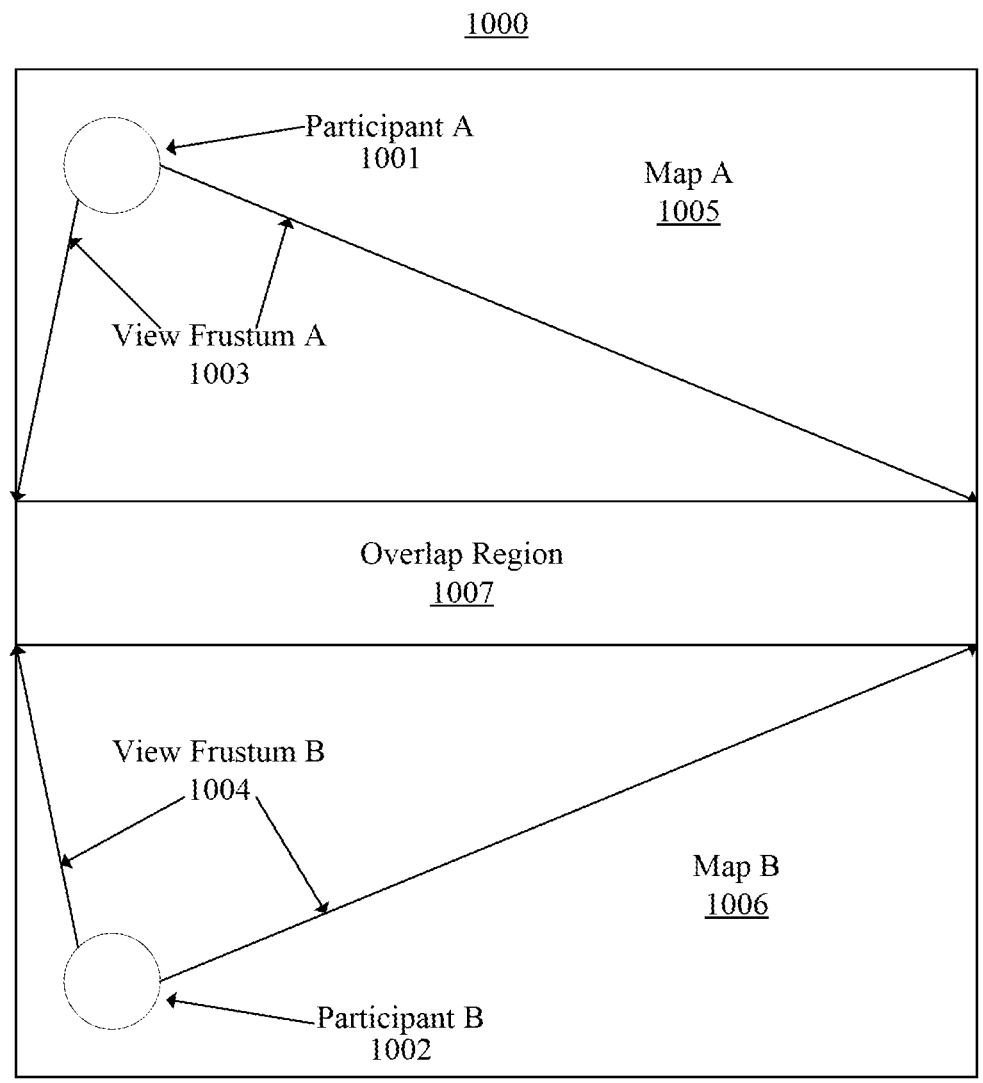
FIGS. 10A and 10B illustrate a diagram, where participant maps are merged together to generate a combined map in accordance with aspects of the present disclosure.
Figure 10B:
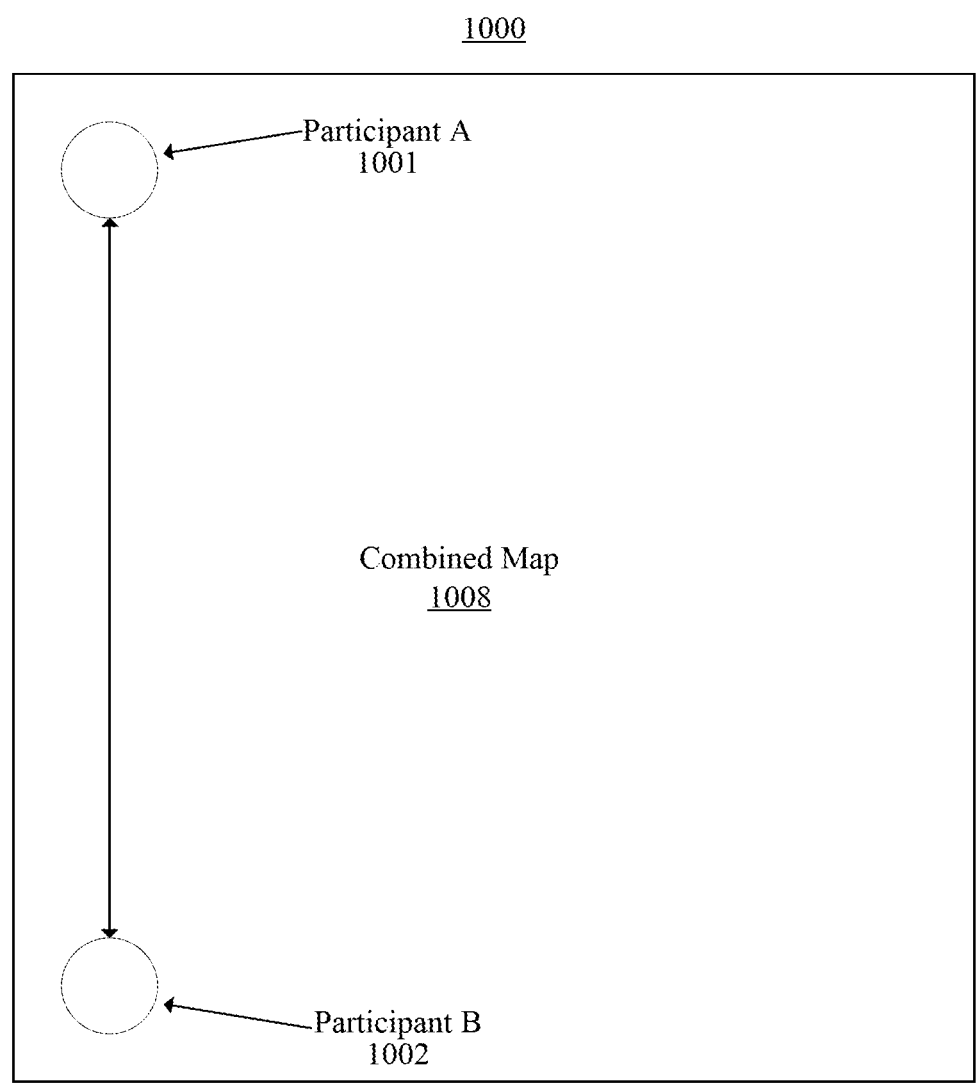

FIG. 10A and FIG. 10B illustrate an example of a diagram 1000, where participants' map portions of the environment, including some areas of overlap, and their respective maps, map A 1005 and map B 1006, are merged into a single representative combined map 1008 in accordance with aspects of the present disclosure. The process 1000 may comprise participant A 1001, participant B 1002, view frustum A 1003, view frustum B 1004, map A 1005, map B 1006, an overlap region 1007 and a combined map 1008.

Participant A 1001 and participant B 1002 may be participating in an augmented reality environment using participant devices. View frustum A 1003 and view frustum B 1004 represent the current view from the participant devices as they are being manipulated by the participants. Map A 1005 and map B 1006 are generated independently of one another and at the same time. There may exist an overlap region 1007 that have been mapped by both participant A 1001 and participant B 1002. Participant map A 1005 and participant map B 1006 merged to form combined map 1008.

Figure 11:
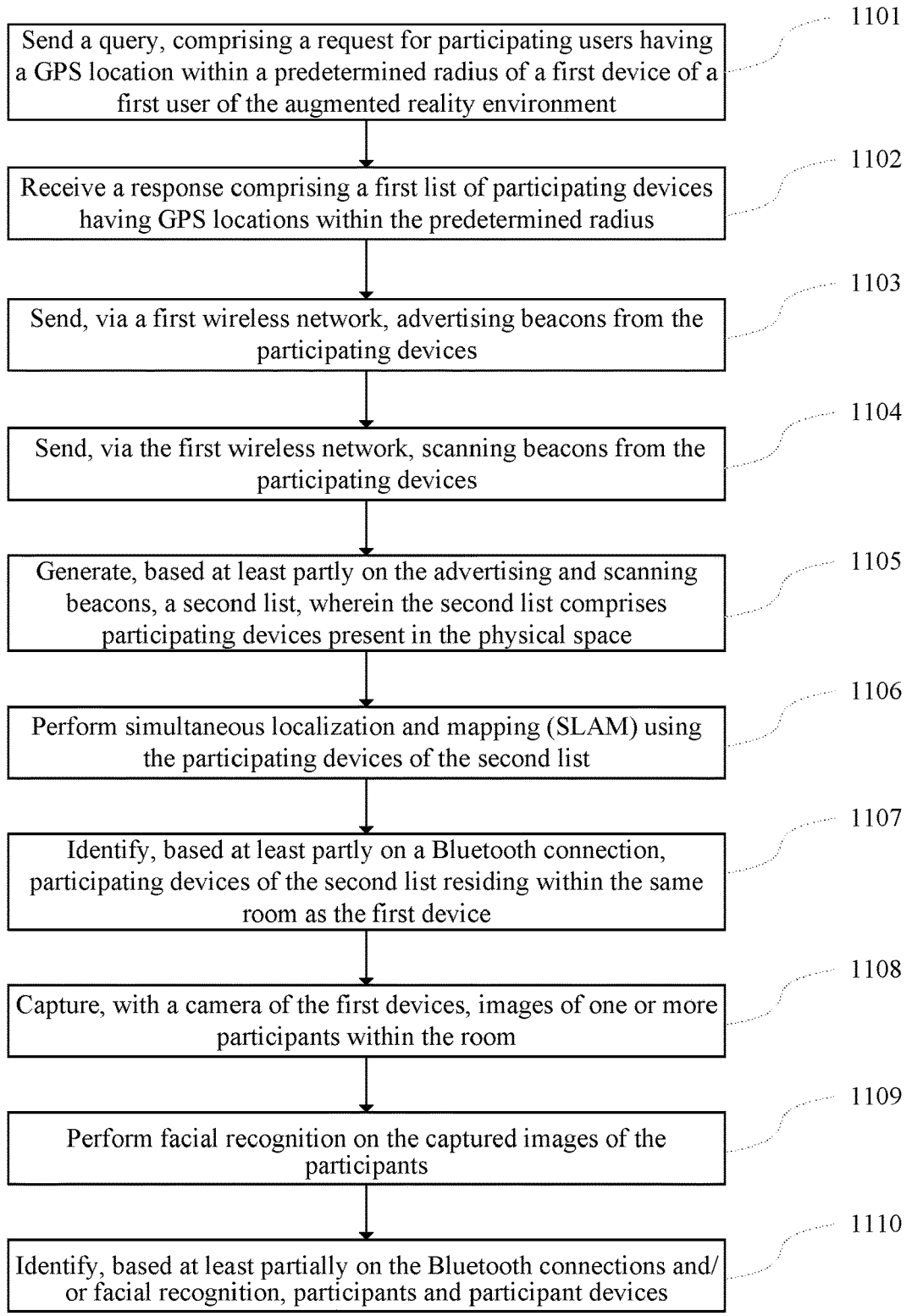
FIG. 11 illustrates an example of a process of locating participants, mapping an environment and determining the identity of participants within a virtual environment in accordance with aspects of the present disclosure.

FIG. 11 illustrates an example of the process 1100 of locating participants, mapping an environment and determining the identity of participants within the environment in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 1101, the system sends a query, comprising a request for participating users having a GPS location within a predetermined radius of a first device of a first user of the augmented reality environment. The query may be sent directly to database 120A-120N. The request may also be sent to location server 120, where a list of participants may be stored and updated while participants are currently in a location. The GPS location module 245 of location server 120 may periodically update the database 120A-120N while processing requests for the participant list or while updating the list with data received from participants currently at the location. GPS location module 245 may also be configured to update the database 120A-120N only after the location no longer has any participants, the number of participants drops below a threshold, or the number of participants exceeds a threshold.

At step 1102, the system receives a response comprising a first list of participating devices having GPS locations within the predetermined radius. Each participating device will become vaguely aware of all other devices within the predetermined radius.

At step 1103, the system sends, via a first wireless network, advertising beacons from the participating devices.

At step 1104, the system sends, via the first wireless network, scanning beacons from the participating devices.

At step 1105, the system generates, based at least partly on the advertising and scanning beacons, a second list, wherein the second list comprises participating devices present in the physical space. The second list may be transmitted to the WIFI location module 246 of the location server 120.

At step 1106, the system performs simultaneous localization and mapping (SLAM) using the participating devices of the second list. The mapping tasks may be divided between one or more participating devices. The division of processing between participating devices may be implemented as Single instruction stream, multiple data streams (SIMD), Multiple instruction streams, single data stream (MISD) or Multiple instruction streams, multiple data streams (MIMD).

At step 1107, the system identifies the participant devices that are currently inside the same room as the first device. This determination may be performed by calculating the distance between the first device and the other participant devices. The determination may also take into consideration the direction the signal is received from and the position and orientation of the first device within the room. The identification of the participant devices may also be based on data transmitted through the Bluetooth connection. Data packets may include information relating to the device's user, location, hardware and software specifications and other identifying characteristics of the participant and/or the participant device.

At step 1108, the first device may capture images of the other participants in the room. The images may be captured as a sequence of images, a single image or video. Multiple images may be combined to generate a higher resolution image of the other participants, which may improve the accuracy of facial recognition and tracking of other participant devices and their associated participants.

At step 1109, they system performs facial recognition on the captured images of the participants. The system may extract landmarks or features from the images of the participants face. These features may then be compared to a database of participant images that are previously collected for each participant. The participant images may be provided at signup, upon first use of the system, or at anytime during use or after the initial signup of the participant. Facial recognition may be performed by principal component analysis using eigenfaces, linear discriminant analysis, hidden Markov models, multilinear subspace learning, dynamic link matching, deep learning, neural networks, machine learning models or combination thereof.

At step 1110, the system identifies the participants and the participant devices associated with the participants by locating the participant devices through their Bluetooth connection with one another, and further identifying the participant using the participant devices based on facial recognition of the images captured of the participant. The captured images may be compared to a database of participant faces. The database may maintain the association of facial images with participants, participant devices, and locations that the participant is currently or has previously occupied. The recognition of the participant's face may then be used to verify the accuracy of the Bluetooth localization of the participant's device and/or identification of the user via comparing a presently captured image (obtained from the participant's device) with a previously stored image of the same participant at a database. The simultaneous determination of positioning through captured images/video and Bluetooth localization may produce a faster and more accurate registration of other participants at the location. In some embodiments, multiple participant devices may recognize that they are in the same physical space based on GPS coordinates. The location server 115 may provide participants with a list of other participants within a specified radius of the physical location. The participant devices may connect to WIFI access points (APs) that are operating at the physical location. One or more APs may be present at the physical location (e.g., mall). The stationary locations of the APs may be stored at the application server 110, location server 115, databases 120A-120N or combination thereof. Such stationary and known locations may further improve the accuracy and speed at which maps can be generated as well as improve the speed and accuracy of the localization and tracking of participant devices within the physical location.

Participant devices may also detect each other through connecting to the same AP. APs have a longer range than a peer-to-peer WIFI connection and would allow for an intermediate culling of participant devices between the first list, based on GPS coordinates and the second list, based on direct WIFI peer-to-peer connections.

A list may be stored of WIFI networks (SSID), IP addresses associated with the networks, MAC address of participant and WIFI devices, device IDs (e.g., Universal Device ID (UDID), identifierForAdvertising (IDFA), identifierForVendor (IDFV), Mobile Device Identifier (MDID), Windows Advertising ID, Android Advertising ID, Google Advertising ID, IMEI or MEID) and locations associated with each.

This list may be used in the identification of participant devices, the generation of three-dimensional maps of physical location, and the locating of the participant devices within the generated maps.

In some embodiments, the downloading of the participant list from the location server 115, downloading of the available map data, performing SLAM, recognizing objects and augmenting the captured video of the physical location may all be performed in parallel.

In some embodiments, devices may independently and simultaneously access and download map data and participant lists from application server 110, location server 115, databases 120A-120N or combination thereof. The information may additionally be accessible via a cloud computing platform. Each participant device may access and download map data and participant lists through their own mobile data connection (e.g., GSM, 3G, 4G, 5G, LTE, etc.). Participant devices may also access and download map data and participant lists through a connected WIFI network.

In some embodiments, a participant device may start downloading data from the application server 110, location server 115, databases 120A-120N or combination thereof. Upon detection of one or more addition participant devices, which may also be downloading data from the same or different sources, the remaining data that is to be transferred, may be split amongst the participant devices. This may be useful in reducing bandwidth or other resource usage at the servers or databases, since each participant device only needs a portion of the data and not all of it. Scaling of the system may be more easily accomplishes since an increase in participant devices will only slightly increase the bandwidth required to serve data to each location.

Participant devices may share data between each other upon receipt of the data. This may allow for every participant device to have a full copy of data for the physical location. Alternatively, each participant device may perform mapping, localization and other processes with the portion of the data they received. After the mapping, localization and other processes have been completed, the results may be shared and merged with the results from the other participant devices. Sharing between the participant devices may be accomplished through their Bluetooth connections, WIFI connections, or combination thereof.

The data downloaded may be data for an entire space (e.g., building or mall), portions of a space (e.g., stores or floors of a building) or regions within a radius of the participant devices. Data may be broken into smaller grids, and only grid cells that overlap between participant devices may be split between the participant devices. Grid cells that do not overlap may be downloaded only by the participant device within the radius. Alternatively, a larger area that incorporates all the grid cells covered by the participant devices within a certain distance from each other may be split and downloaded between those participant devices.

In some embodiments, the participant devices may constantly scan for other participant devices in the location. The scanning can be performed over Bluetooth, WIFI or a combination thereof. Alternatively, the participant devices may be notified by a push notification when a new participant device enters the location. The push notification may include additional information about the participant device that has entered. By not continually scanning for other participant devices, battery life of the participant devices may be improved.

In some embodiments, there may be multiple WIFI networks are available for participant devices to connect to. The system may make a determination as to which network would provide the fastest connection to the servers and or other participant devices. A determination may also be made as to which network has the most devices within range. Participant devices may change networks to optimize the speed of data transfer between participant devices. The mobile network of the participant device may be considered when making a determination of the network to be used for data transfer.

In some embodiments, the system may use a combination of location tracking, communication protocols, image recognition and computer vision to lead participants through a process of discovering and eventually locating each other. The participants progress from a "vague aware" of other participants to "sensing the presence" of the other participants, and eventually to precisely or near-precisely locating each other within the participants line of sight.

In a way, the process of traversing these different stages of awareness is akin to how human senses of perception are activated, one after another, depending on proximity. Receiving a list of participants within a predetermined radius based on GPS coordinates gives the participant a "vague awareness" of other participants within the vicinity. When participants are within a range that allows for a WIFI connection to be established, the participants may "sense the presence" of one another as they would be within hearing distance. The further refinement of the location of participants continues as Bluetooth connections are made and beacons received/sent between participant devices. Combining of Bluetooth localization with object recognition and computer vision provides for a registration of images and coordinate systems to create highly accurate three-dimensional maps, and the augmentation of the environment through overlaying virtual objects at precise coordinates of real world physical objects. The accurate maps and location determination of other participants may also allow for a more accurate and faster tracking of other participants and their devices. By more quickly and accurately tracking the precise movements of other participants, virtual objects overlaid on said other participants will maintain their relative positioning, even in the event of rapid movement of the participant device or the other participants. This eliminates the lag of the virtual objects displayed to the user, which many existing artificial intelligence systems suffer from.

Figure 12:
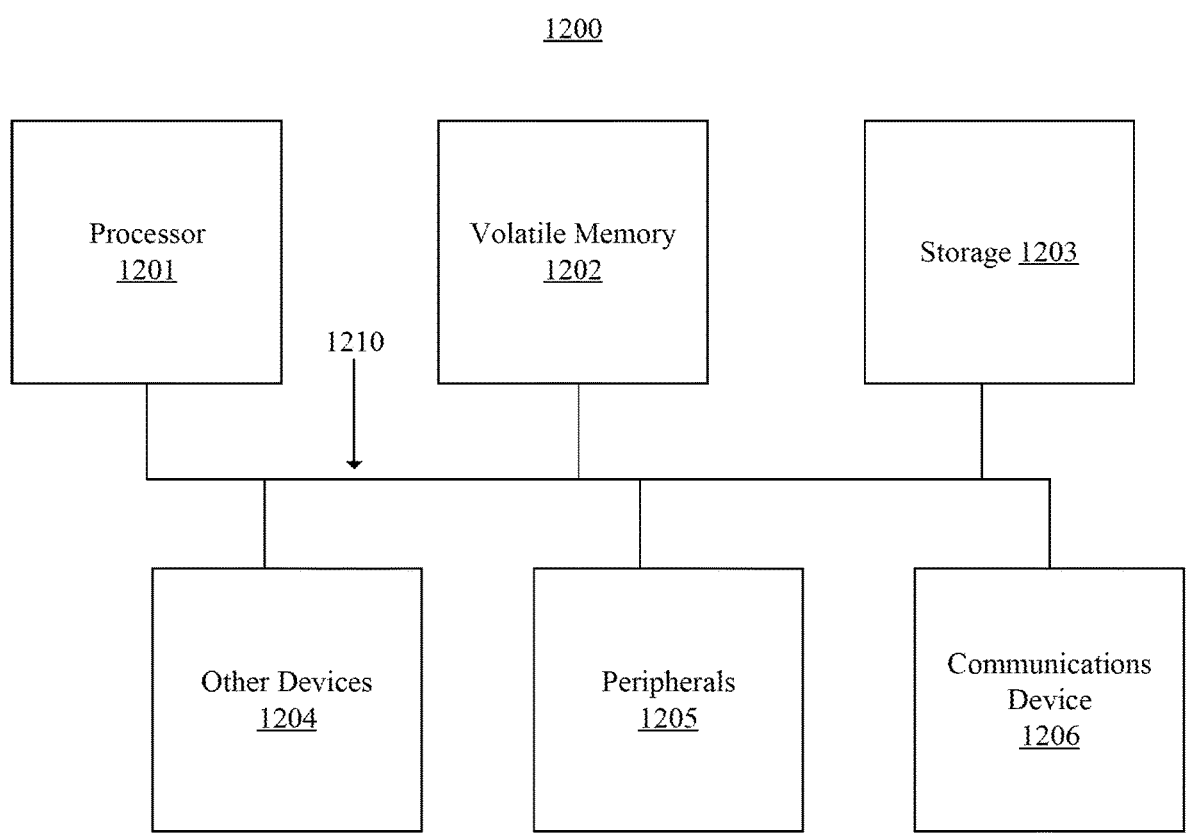
FIG. 12 is a diagram illustrating an exemplary computer that may perform processing in some embodiments and in accordance with aspects of the present disclosure.

FIG. 12 is a diagram illustrating an exemplary computer that may perform processing in some embodiments. Exemplary computer 1200 may perform operations consistent with some embodiments. The architecture of computer 1200 is exemplary. Computers can be implemented in a variety of other ways. A wide variety of computers can be used in accordance with the embodiments herein.

Processor 1201 may perform computing functions such as running computer programs. The volatile memory 1202 may provide temporary storage of data for the processor 1201. RAM is one kind of volatile memory. Volatile memory typically requires power to maintain its stored information. Storage 1203 provides computer storage for data, instructions, and/or arbitrary information. Non-volatile memory, which can preserve data even when not powered and including disks and flash memory, is an example of storage. Storage 1203 may be organized as a file system, database, or in other ways. Data, instructions, and information may be loaded from storage 1203 into volatile memory 1202 for processing by the processor 1201.

The computer 1200 may include peripherals 1205. Peripherals 1205 may include input peripherals such as a keyboard, mouse, trackball, video camera, microphone, and other input devices. Peripherals 1205 may also include output devices such as a display. Peripherals 1205 may include removable media devices such as CD-R and DVD-R recorders/players. Communications device 1206 may connect the computer 100 to an external medium. For example, communications device 1106 may take the form of a network adapter that provides communications to a network. A computer 1200 may also include a variety of other devices 1204. The various components of the computer 1200 may be connected by a connection medium 1210 such as a bus, crossbar, or network.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method of determining physical location of a device of a user of an augmented reality environment corresponding to a physical space, the method comprising:
   sending to a database, a query, comprising a request for participating users having a GPS location within a predetermined radius of a first device of a first user of the augmented reality environment;
   receiving from the database, a response comprising a first list of participating devices having GPS locations within the predetermined radius;
   sending, via a first wireless network, advertising beacons from the participating devices;
   sending, via the first wireless network, scanning beacons from the participating devices;
   generating, based at least partly on the advertising and scanning beacons, a second list, wherein the second list comprises participating devices present in the physical space;
   performing simultaneous localization and mapping (SLAM) using the participating devices of the second list;
   generating, based at least partly on a Bluetooth connection between one or more participating devices of the second list, a third list, wherein the third list comprises participating devices of the second list determined to be within a predetermined distance of one another;
   identifying the participating devices of the third list;
   generating an augmented reality representation of the physical space on one or more participating devices; and
   visually identifying the identified participating devices of the third list in the augmented reality representation.

2. The method of claim 1, wherein SLAM comprises:
   receiving three-dimensional maps of the physical space from the participating devices; and
   merging the three-dimensional maps into a merged map of the physical space.

3. The method of claim 1, further comprising:
   receiving three-dimensional maps of the physical space from the participating devices of the second list; and
   generating a submap of the physical space, comprising the three-dimensional maps of the physical space received from the participating devices of the second list.

4. The method of claim 1, wherein the augmented reality representation comprises a three-dimensional map of the physical space generated, at least in part by performing SLAM using the participating devices of the second list.

5. The method of claim 1, wherein the representation comprises video image frames.

6. The method of claim 1, further comprising locating the identified participants in one or more three-dimensional maps of the physical space, generated by the participating devices of the second and/or third list.

7. The method of claim 1, further comprising: receiving device identifiers in response to the advertising and scanning beacons, wherein generating the second list comprises removing participating devices of the first list whose device identifiers are not received.

8. The method of claim 1, wherein performing SLAM is divided between the participating devices of the third list.

9. The method of claim 1, wherein generating the third list comprises identifying the participating devices able to form a Bluetooth connection with one another.

10. A non-transitory computer-readable medium for determining physical location of a device of a user of an augmented reality environment corresponding to a physical space, the non-transitory computer readable medium comprising instructions for:
    sending to a database, a query, comprising a request for participating users having a GPS location within a predetermined radius of a first device of a first user of the augmented reality environment;
    receiving from the database, a response comprising a first list of participating devices having GPS locations within the predetermined radius;
    sending, via a first wireless network, advertising beacons from the participating devices;
    sending, via the first wireless network, scanning beacons from the participating devices;
    generating, based at least partly on the advertising and scanning beacons, a second list, wherein the second list comprises participating devices present in the physical space;
    performing simultaneous localization and mapping (SLAM) using the participating devices of the second list;
    generating, based at least partly on a Bluetooth connection between one or more participating devices of the second list, a third list, wherein the third list comprises participating devices of the second list determined to be within a predetermined distance of one another;
    identifying the participating devices of the third list;
    generating an augmented reality representation of the physical space on one or more participating devices; and
    visually identifying the identified participating devices of the third list in the augmented reality representation.

11. The non-transitory computer readable medium of claim 10, wherein SLAM comprises:
    receiving three-dimensional maps of the physical space from the participating devices; and
    merging the three-dimensional maps into a merged map of the physical space.

12. The non-transitory computer readable medium of claim 10, further comprising instructions for:
    receiving three-dimensional maps of the physical space from the participating devices of the second list; and generating a submap of the physical space, comprising the three-dimensional maps of the physical space received from the participating devices of the second list.

13. The non-transitory computer readable medium of claim 10, wherein the augmented reality representation comprises a three-dimensional map of the physical space generated, at least in part by performing SLAM using the participating devices of the second list.

14. The non-transitory computer readable medium of claim 10, wherein the representation comprises video image frames.

15. The non-transitory computer readable medium of claim 10, further comprising instructions for: locating the identified participants in one or more three-dimensional maps of the physical space, generated by the participating devices of the second and/or third list.

16. The non-transitory computer readable medium of claim 10, further comprising instructions for: receiving device identifiers in response to the advertising and scanning beacons, wherein generating the second list comprises removing participating devices of the first list whose device identifiers are not received.

17. The non-transitory computer readable medium of claim 10, wherein performing SLAM is divided between the participating devices of the third list.

18. The non-transitory computer readable medium of claim 10, wherein generating the third list comprises identifying the participating devices able to form a Bluetooth connection with one another.

* * * * *